US006977887B1

(12) United States Patent
Hauck et al.

(10) Patent No.: US 6,977,887 B1
(45) **Date of Patent: *Dec. 20, 2005**

(54) METHOD AND APPARATUS FOR LOOP BREAKING ON A SERIAL BUS

(75) Inventors: Jerrold Von Hauck, Fremont, CA (US); Colin Whitby-Strevens, Bristol (GB)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/464,246

(22) Filed: Jun. 17, 2003

Related U.S. Application Data

(63) Continuation of application No. 09/350,583, filed on Jul. 9, 1999, now Pat. No. 6,628,607.

(51) Int. Cl.[7] .............................................. H04L 12/26
(52) U.S. Cl. ..................................................... 370/216
(58) Field of Search ................................ 370/216, 241, 370/254, 232, 252, 316; 709/224, 232; 710/107, 710/224, 104

(56) References Cited

U.S. PATENT DOCUMENTS

| | | | | |
|---|---|---|---|---|
| 4,156,798 | A | 5/1979 | Doelz | 179/15 AL |
| 4,194,113 | A | 3/1980 | Fulks et al. | 371/20 |
| 5,014,262 | A | 5/1991 | Harshavardhana | 370/16 |
| 5,274,631 | A | 12/1993 | Bhardwaj | 370/60 |
| 5,343,461 | A | 8/1994 | Barton et al. | 370/13 |
| 5,394,556 | A | 2/1995 | Oprescu | 395/800 |
| 5,406,643 | A | 4/1995 | Burke et al. | 395/200 |
| 5,452,330 | A | 9/1995 | Goldstein | 375/257 |
| 5,490,253 | A | 2/1996 | Laha et al. | 395/304 |
| 5,495,481 | A | 2/1996 | Duckwall | 370/85.2 |
| 5,524,254 | A | 6/1996 | Morgan et al. | 395/800 |
| 5,539,390 | A | 7/1996 | Nagano et al. | 340/825.07 |
| 5,541,670 | A | 7/1996 | Hanai | 348/705 |
| 5,568,641 | A | 10/1996 | Nelson | 395/700 |
| 5,583,922 | A | 12/1996 | Davis et al. | 379/96 |
| 5,621,659 | A | 4/1997 | Matsumoto et al. | 364/514 R |
| 5,630,173 | A | 5/1997 | Oprescu | 395/860 |
| 5,640,595 | A | 6/1997 | Baugher et al. | 395/830 |
| 5,642,515 | A | 6/1997 | Jones et al. | 395/727 |
| 5,654,657 | A | 8/1997 | Pearce | 327/163 |
| 5,684,715 | A | 11/1997 | Palmer | 365/514 |
| 5,701,476 | A | 12/1997 | Fenger | 395/652 |
| 5,701,492 | A | 12/1997 | Wadsworth et al. | 395/712 |

(Continued)

FOREIGN PATENT DOCUMENTS

| | | | |
|---|---|---|---|
| EP | 1 085 706 A2 | 3/2001 | H04L 12/46 |

(Continued)

OTHER PUBLICATIONS

"IEEE Standard for a High Performance Serial Bus", IEEE Standard 1394-1995, Institute of Electrical and Electronics Engineers, Inc., Aug. 30, 1996.

(Continued)

*Primary Examiner*—Chi Pham
*Assistant Examiner*—Prenell Jones
(74) *Attorney, Agent, or Firm*—Sierra Patent Group, Ltd.

(57) ABSTRACT

A method for loop breaking includes selecting a first port of a node, transmitting a first packet containing a first identifier from the first port of the node, listening for a second packet containing a second identifier for a period of time on a second port of the node, joining the first port and the node if the second identifier meets a first criteria with respect to the first identifier and quarantining the first port when the second identifier meets a second criteria with respect to the first identifier.

4 Claims, 23 Drawing Sheets

Begin
Select Next Untested Port 190
Arbitrate for Loop Test 192
Send Loop Test Packet (TxLTP) 194
RxLTP< TxLTP? 196 Y → Join Port and Main Bus 198
N
RxLTP> TxLTP? 200 Y → Surrender 202
N
Issue Random Challenge 204
RxLTP< TxLTP? 206 Y → Join Port and Main Bus 210
N
RxLTP> TxLTP? 208 Y → Surrender 212
N
Quarantine 214

U.S. PATENT DOCUMENTS

| | | | | |
|---|---|---|---|---|
| 5,706,278 | A | 1/1998 | Robillard et al. | 370/222 |
| 5,712,834 | A | 1/1998 | Nagano et al. | 369/19 |
| 5,719,862 | A | 2/1998 | Lee et al. | 370/355 |
| 5,754,765 | A | 5/1998 | Danneels et al. | 395/200.1 |
| 5,764,930 | A | 6/1998 | Staats | 395/287 |
| 5,784,648 | A | 7/1998 | Duckwall | 395/860 |
| 5,802,048 | A | 9/1998 | Duckwall | 370/389 |
| 5,802,057 | A | 9/1998 | Duckwall et al. | 370/408 |
| 5,802,365 | A | 9/1998 | Kathail et al. | 395/681 |
| 5,805,073 | A | 9/1998 | Nagano et al. | 340/825.07 |
| 5,809,331 | A | 9/1998 | Staats et al. | 395/830 |
| 5,826,027 | A | 10/1998 | Pedersen et al. | 395/200.51 |
| 5,832,298 | A | 11/1998 | Sanchez et al. | 395/828 |
| 5,835,761 | A | 11/1998 | Ishii et al. | 395/653 |
| 5,845,152 | A | 12/1998 | Anderson et al. | 395/872 |
| 5,867,730 | A | 2/1999 | Leyda | 395/830 |
| 5,875,301 | A | 2/1999 | Duckwall et al. | 395/200.51 |
| 5,923,663 | A | 7/1999 | Bontemps et al. | 370/455 |
| 5,930,480 | A | 7/1999 | Staats | 395/200.74 |
| 5,935,208 | A | 8/1999 | Duckwall et al. | 709/221 |
| 5,938,764 | A | 8/1999 | Klein | 713/1 |
| 5,940,600 | A | 8/1999 | Staats et al. | 395/287 |
| 5,954,796 | A | 9/1999 | McCarty et al. | 709/222 |
| 5,968,152 | A | 10/1999 | Staats | 710/104 |
| 5,970,052 | A | 10/1999 | Lo et al. | 370/241 |
| 5,987,605 | A | 11/1999 | Hill et al. | 713/2 |
| 5,991,842 | A | 11/1999 | Takayama | 710/105 |
| 6,032,202 | A | 2/2000 | Lea et al. | 710/8 |
| 6,032,261 | A | 2/2000 | Hulyalkar | 713/400 |
| 6,038,234 | A | 3/2000 | LaFollette et al. | 370/443 |
| 6,038,625 | A | 3/2000 | Ogino et al. | 710/104 |
| 6,070,187 | A | 5/2000 | Subramaniam et al. | 709/220 |
| 6,073,206 | A | 6/2000 | Piwonka et al. | 711/102 |
| 6,091,726 | A | 7/2000 | Crivellari et al. | 370/392 |
| 6,115,764 | A | 9/2000 | Chisholm et al. | 710/100 |
| 6,122,248 | A | 9/2000 | Murakoshi et al. | 370/216 |
| 6,131,129 | A | 10/2000 | Ludtke | 710/5 |
| 6,131,134 | A | 10/2000 | Huang et al. | 710/103 |
| 6,133,938 | A | 10/2000 | James | 348/8 |
| 6,138,196 | A | 10/2000 | Takayama et al. | 710/105 |
| 6,141,702 | A | 10/2000 | Ludtke et al. | 710/5 |
| 6,141,767 | A | 10/2000 | Hu et al. | 714/1 |
| 6,145,018 | A | 11/2000 | LaFollette et al. | 710/8 |
| 6,157,972 | A | 12/2000 | Newman et al. | 710/100 |
| 6,160,796 | A | 12/2000 | Zou | 370/257 |
| 6,167,532 | A | 12/2000 | Wiseccup | 713/300 |
| 6,173,327 | B1 | 1/2001 | De Borst et al. | 709/231 |
| 6,192,189 | B1 | 2/2001 | Fujinami et al. | 386/96 |
| 6,199,119 | B1 | 3/2001 | Duckwall et al. | 710/8 |
| 6,202,210 | B1 | 3/2001 | Ludtke | 725/20 |
| 6,212,171 | B1 | 4/2001 | LaFollette et al. | 370/257 |
| 6,212,633 | B1 | 4/2001 | Levy et al. | 713/153 |
| 6,219,697 | B1 | 4/2001 | Lawande et al. | 709/221 |
| 6,233,615 | B1 | 5/2001 | Van Loo | 709/224 |
| 6,233,624 | B1 | 5/2001 | Hyder et al. | 709/327 |
| 6,243,778 | B1 | 6/2001 | Fung et al. | 710/113 |
| 6,247,063 | B1 | 6/2001 | Ichimi et al. | 709/250 |
| 6,247,083 | B1 | 6/2001 | Hake et al. | 710/107 |
| 6,253,114 | B1 | 6/2001 | Takihara | 700/83 |
| 6,253,255 | B1 | 6/2001 | Hyder et al. | 709/321 |
| 6,260,063 | B1 | 7/2001 | Ludtke et al. | 709/224 |
| 6,266,334 | B1 | 7/2001 | Duckwall | 370/397 |
| 6,266,344 | B1 | 7/2001 | Fujimori et al. | 370/468 |
| 6,266,701 | B1 | 7/2001 | Sridhar et al. | 709/232 |
| 6,275,889 | B1 | 8/2001 | Saito | 710/129 |
| 6,282,597 | B1 | 8/2001 | Kawamura | 710/105 |
| 6,292,840 | B1 | 9/2001 | Blomfield-Brown et al. | 709/247 |
| 6,295,479 | B1 | 9/2001 | Shima et al. | 700/83 |
| 6,308,222 | B1 | 10/2001 | Krueger et al. | 709/247 |
| 6,311,228 | B1 | 10/2001 | Ray | 709/301 |
| 6,314,461 | B2 | 11/2001 | Duckwall et al. | 709/221 |
| 6,343,321 | B2 | 1/2002 | Patki et al. | 709/227 |
| 6,345,315 | B1 | 2/2002 | Mishra | 709/329 |
| 6,347,362 | B1 | 2/2002 | Schoinas et al. | 711/147 |
| 6,353,868 | B1 | 3/2002 | Takayama et al. | 710/129 |
| 6,356,558 | B1 | 3/2002 | Hauck et al. | 370/450 |
| 6,363,085 | B1 | 3/2002 | Samuels | 370/502 |
| 6,373,821 | B2 | 4/2002 | Staats | 370/252 |
| 6,385,679 | B1 | 5/2002 | Duckwall et al. | 710/119 |
| 6,405,247 | B1 | 6/2002 | Lawande et al. | 709/221 |
| 6,411,628 | B1 | 6/2002 | Hauck et al. | 370/447 |
| 6,418,150 | B1 | 7/2002 | Staats | 370/503 |
| 6,425,019 | B1 | 7/2002 | Tateyama et al. | 710/11 |
| 6,426,062 | B1 | 7/2002 | Chopra et al. | 424/65 |
| 6,442,630 | B1 | 8/2002 | Takayama et al. | 710/105 |
| 6,446,142 | B1 | 9/2002 | Shima et al. | 710/16 |
| 6,452,975 | B1 | 9/2002 | Hannah | 375/257 |
| 6,457,086 | B1 | 9/2002 | Duckwall | 710/305 |
| 6,466,982 | B1 | 10/2002 | Ruberg | 709/227 |
| 6,496,862 | B1 | 12/2002 | Akatsu et al. | 709/224 |
| 6,519,657 | B1 | 2/2003 | Stone et al. | 710/10 |
| 6,529,522 | B1 | 3/2003 | Ito et al. | 370/466 |
| 6,587,904 | B1 * | 7/2003 | Hauck et al. | 710/107 |
| 6,628,607 | B1 * | 9/2003 | Hauck et al. | 370/216 |
| 2001/0001151 | A1 | 5/2001 | Duckwall et al. | 710/8 |
| 2001/0019561 | A1 | 9/2001 | Staats | 370/487 |
| 2001/0024423 | A1 | 9/2001 | Duckwall et al. | 370/254 |
| 2002/0057655 | A1 | 5/2002 | Staats | 370/256 |
| 2002/0085581 | A1 | 7/2002 | Hauck et al. | 370/442 |
| 2002/0101231 | A1 | 8/2002 | Staats | 324/126 |
| 2002/0103947 | A1 | 8/2002 | Duckwall et al. | 710/19 |
| 2002/0188780 | A1 | 12/2002 | Duckwall | 710/105 |
| 2002/0188783 | A1 | 12/2002 | Duckwall et al. | 710/119 |
| 2003/0037161 | A1 | 2/2003 | Duckwall et al. | 709/233 |
| 2003/0055999 | A1 | 3/2003 | Duckwall et al. | 709/236 |

FOREIGN PATENT DOCUMENTS

| | | | |
|---|---|---|---|
| EP | 1 085 706 A3 | 10/2002 | H04L 12/46 |

OTHER PUBLICATIONS

"AV/C Digital Interface Command Set General Specification, Rev. 3.0", 1394 Trade Association, pp. 4-5, 20-34, Apr. 15, 1998.

"Enhancements to the AV/C General Specification, Rev. 3.0", 1394 Trade Association, pp. 4, 6-17, Nov. 5, 1998.

"Fibre Channel-Methodologies for Jitter Specification", NCITS TR-25-1999, Jitter Working Group Technical Report, Rev. 10, pp. 1-96, Jun. 9, 1999.

S. Bregni et al., "Jitter Testing Technique and Results at VC-4 Desynchronizer Output of SDH Equipment", *IMTC'94*, pp. 1407-1410, May 10-12, 1994.

"Information Technology-Microprocessor Systems-Control and Status Registers (CSR) Architecture for Microcomputer Buses", ANSI/IEEE Standard 1212, The Institute of Electrical and Electronics Engineers, Inc., pp. 1-122, 1994 Edition.

S. Bregni et al., "Jitter Testing Technique and Results at VC-4 Desynchronizer Output of SDH Equipment", *IEEE Transactions on Instrumentation and Measurement*, vol. 44, No. 3, pp. 675-678, Jun. 1995.

M. Shiwen et al., "Parallel Positive Justification In SDH C_4 Mapping", *International Conference on Communications,* (*ICC'97*), Montreal, Quebec, Canada, vol. 3, pp. 1577-1581, Aug. 1997.

Information Technology-Fibre Channel-Methodologies for Jitter Specification, NCITS Technical Report (NCITS TR-25-1999, REV 10), pp. 1-96, Jun. 9, 1999.

"IEEE Standard for a High Performance Serial Bus-Amendment 1", Institute of Electrical and Electronics Engineers, Inc., pp. 1-196, Approved Mar. 30, 2000.

P1394b IEEE Draft Standard for a High Performance Serial Bus (High Speed Supplement), Institute of Electrical and Electronics Engineers, Inc., pp. 1-408, Nov. 2001.

* cited by examiner

Quarantined

METHOD AND APPARATUS FOR LOOP BREAKING ON A SERIAL BUS

CROSS REFERENCE TO RELATED APPLICATIONS

This application is a continuation of U.S. patent application Ser. No. 09/350,583, filed Jul. 9, 1999 now U.S. Pat. No. 6,628,607.

BACKGROUND OF THE INVENTION

1. Field of the Invention

The present invention relates to data communications. More particularly, the present invention relates to a method and apparatus for loop breaking on a serial bus.

2. Background

Computer systems and other digital electronic systems often use a common interconnect to share information between components of the systems. The interconnect used in such systems is typically a serial bus. The correct operation of any bus requires that there be exactly one path between any two components on the bus.

The IEEE1394-1995 standard defines one type of serial bus. IEEE Standards document 1394-1995, entitled IEEE Standard for a High Performance serial bus (hereinafter "IEEE1394-1995 standard"). A typical serial bus having the IEEE1394-1995 standard architecture includes many nodes that are interconnected by links such as cables that connect a single node of the serial bus to another node of the serial bus. Nodes interface to links via one or more parts. Data packets are propagated throughout the serial bus using a number of transactions. These transactions involve one node receiving a packet from another node via one link and retransmitting the received packet to other nodes via other links. A tree network configuration and the associated packet handling protocol ensures that each node receives every packet once.

The IEEE1394-1995 standard provides for an arbitrary acyclic bus topology. Correct operation of the bus relies on the superimposition of a hierarchical relationship which is contained by the manner in which the nodes are connected to one another. In IEEE1394-1995, this relationship is determined during the bus configuration process.

An IEEE1394-1995 serial bus is configured in three phases: bus initialization, tree identification (tree-ID) and self identification (self-ID). During bus initialization, the general topology information of the serial bus is identified according to a tree metaphor. For example, each node is identified as being either a "branch" having more than one connected ports of a "leaf" having only one connected port. A node recognizes its status as a leaf node or a branch node immediately upon entering tree-ID. During tree identification, hierarchical relationships are established between the nodes. For example, one node is designated a "root" node, and the hierarchy of the remaining nodes is established with respect to the relative nearness of a node to the root node. Given two nodes that are connected to one another, the node connected closer to the root is the "parent" node, and the node connected farther from the root is the "child". Nodes connected to the root are children of the root. This process of identifying hierarchical relationships continues until the number of children of a node is greater than or equal to one less than the number of connected ports on the node. During self-ID, each node is assigned a bus address and a topology map may be build for the serial bus.

Typically, serial buses such as the IEEE1394-1995 serial bus require knowing what is being plugged in where. For example, the back of many electronic devices has ports for connecting the electronic devices to other electronic devices. Under the IEEE1394-1995 standard, correct bus operation is not possible if electronic devices are connected in a loop configuration. A specific function of the configuration proves is therefore to determine whether a loop is present, and if a loop is found to prevent completion of the configuration process, thereby rendering the bus inoperable. The bus is rendered inoperable when a timeout occurs in the configuration process. The devices must be physically reconnected in some other way to remove the loop. The configuration process provides no indication of how to reconnect the bus in order to remove the loop. Consequently, correctly reconnecting the devices requires a detailed understanding of how the devices may properly be connected. Typical users of theses devices do not have such an understanding. Thus, devices on a bus may be reconnected may times using a sort of "hit-or-miss" approach before the loop is removed.

Buses such as the IEEE1394-1995 serial bus are being used increasingly to connect products for home use. These products include televisions, stereos and other home entertainment devices. Requiring typical users of such products to know what should be plugged in where is unnecessarily burdensome. Accordingly, a need exists in the prior art for a method and apparatus for loop detection and loop breaking such that devices on a bus remain connected to their neighbors, even in the presence of one or more loops.

BRIEF DESCRIPTION OF THE INVENTION

A method for loop breaking includes selecting a first port of a node, transmitting a first packet containing a first identifier from the first port of the node, listening for a second packet containing a second identifier for a period of time on a second port of the node, joining the first port and the node if the second identifier meets a first criteria with respect to the first identifier and quarantining the first port when the second identifier meets a second criteria within respect to the first identifier. In another aspect, a serial bus includes a plurality of nodes and a and a plurality of communications links interconnecting the nodes, each communications link being coupled between two nodes in a manner such that each node is coupled to every other node via one or more communications links, wherein at least one of the plurality of nodes includes at least one port coupled to a communications link and operative to transmit and receive data via the communications link, wherein a loop passing through a node is broken by internally isolating at least one port from the node, such that all ports of the node remain connected to their neighbors.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to data communications. More particularly, the present invention relates to a method and apparatus for loop breaking on a serial bus. The invention further relates to machine readable media on which are stored (1) the layout parameters of the present invention and/or (2) program instructions for using the present invention in performing operations on a computer. Such media includes by way of example magnetic tape, magnetic disk, or optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

Although the bus architecture described herein is described with reference to components for a single computer, the bus architecture has a broader scope. The bus architecture could include audio and video components, home appliances, positioning and robotic systems, and test and measurement systems, for example. The present invention may be applied to any arbitrarily assembled collection of nodes linked together as a network of devices. In addition, it is necessary to distinguish a node from a physical computer component. Each component to reside on a bus will have with it at least one node physical layer controller. A given component may be associated with multiple nodes. However, there will usually be a one-to-one correspondence between devices or components and nodes on a bus.

According to the IEEE1394-1995 standard, reconfiguration of a serial bus is required when either (1) a new node is joined to the serial bus, or (2) an identified node of the serial bus is removed from the serial bus. Reconfiguration is required to better ensure that all nodes of the serial bus are notified of the newly connected of disconnected node and that each node has a unique bus address. Typically, the node of the serial bus that detects a new connection or disconnection forces the three phase configuration to be performed by asserting a bus reset signal.

Figure 1:
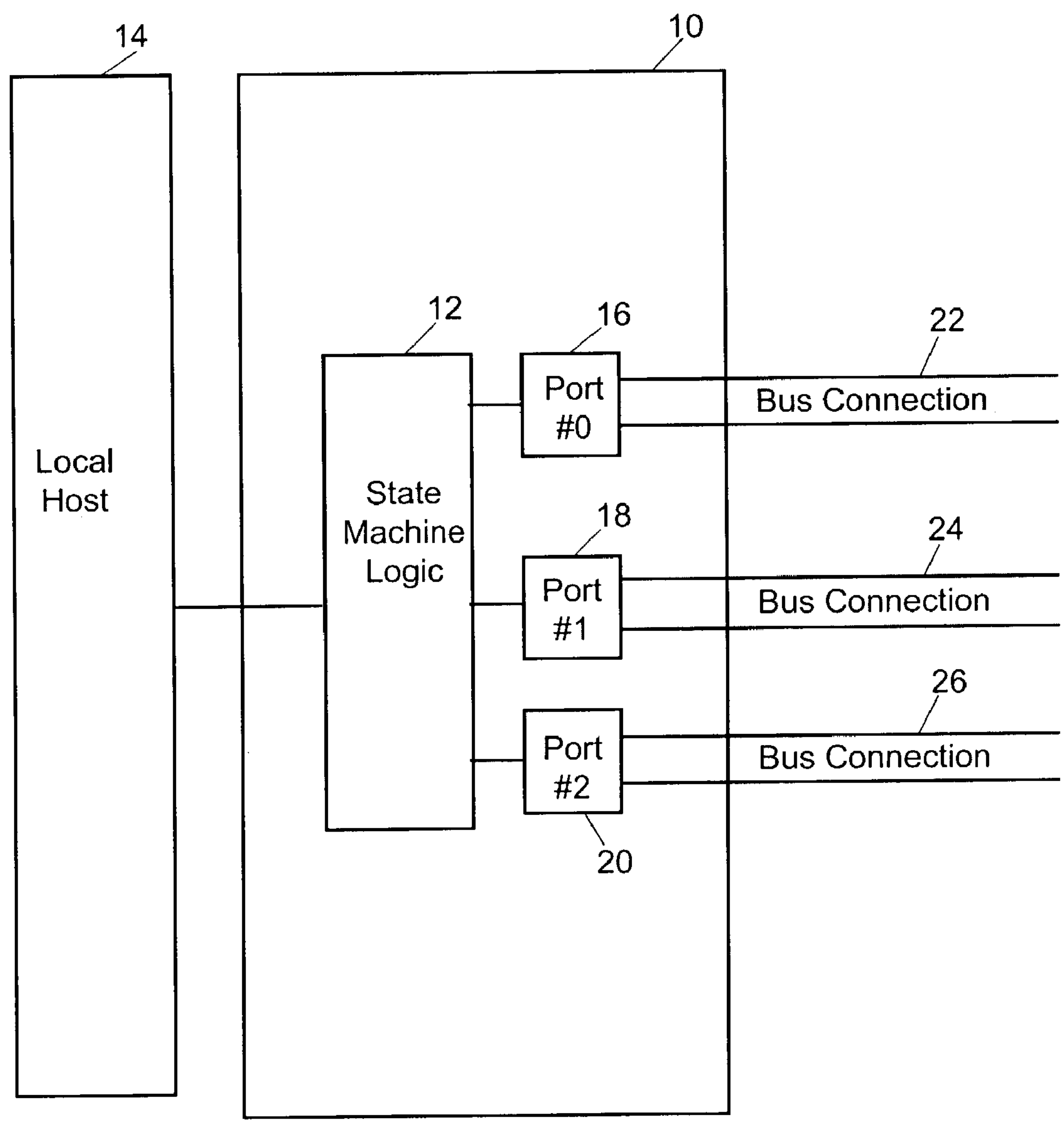
FIG. 1 is a block diagram that illustrates a node according to the present invention.

Referring now to FIG. 1, a block diagram of a node 10 is illustrated. In a preferred embodiment, the nodes are designed to be compatible with the IEEE1394-1995 Serial Bus Standard. The node 10 includes state machine logic 12. This state machine logic 12 incorporates all the logic circuitry for carrying out the methodologies and algorithms to be described herein. The circuitry may comprise a programmable logical array (PLA) or be uniquely designed to carry out the functions described herein. Those of ordinary skill in the art, having the benefit of this disclosure, will be able to implement the present invention without undue experimentation. The node 10 is coupled to a local host 14. The local host 14 may be any device one withes to attach to the bus, such as a disk drive, CPU, keyboard, television, stereo, household appliance, or any other component which needs to communicate with other components in the system. The node 10, by means of its logic, will implement the arbitration protocol including the bus initialization, tree identification and self-identification described above and the loop detecting functions described in detail below.

The node 10 communicates with other nodes through communications links. A link is a connection between two ports. Typically, a cable segment is used for a link. However, a link may be implemented as any physical communication channel, including wireless RF or infrared. A port is the interface between a node and a link. A port has the ability to transmit and receive data. A port can also determine whether it is connected to another port through a link. In FIG. 1, node

10 has three external ports 16, 18, and 20 with connecting links 22, 24, and 26, respectively.

An individual node may have more than one port, and each node is able to transmit and receive data on any one of its ports. A node is also able to receive and transmit signaling messages through all of its ports. In the discussion that follows, devices and local hosts will, for the most part, be omitted and all references to bus topology will refer to nodes and node connection s through various ports.

Figure 2A:
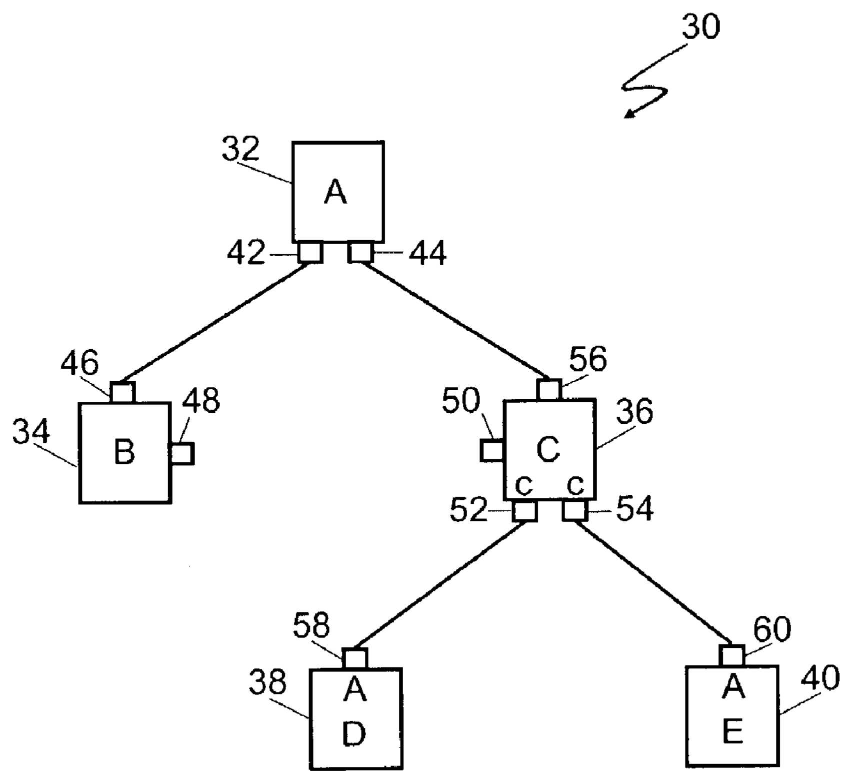
FIG. 2A is a block diagram that illustrates the tree identification process according to the IEEE1394-1995 Serial Bus Standard.

Turning now for FIG. 2A, the tree identification process is illustrated. The tree 30 includes five nodes, labeled A 32, B 34, C 36, D 38, and E 40. Node A 32 has two ports 42 and 44. Node B 34 has two ports 46 and 48. Node C 36 has four ports 50, 52, 54, and 56. Node D 38 has one port 52, and Node E 40 has one port 60. Nodes B 34, D 38, and E 40 are leaf nodes because they have only one connected port. During tree identification, leaf nodes exchange signals with parent nodes to establish the parent-child relationship. Non-leaf nodes must wait until all connected ports but one are designated child ports. Accordingly, Node B 34 sends a "You are my parent" (YMAP) signal to node A 32. Node A 32 responds with a "You are my child" (YMAC) signal. The parent-child relationship between node D 38 and node C 36 and between node E 40 and node C 36 is established in the same way. At this point, all but one port 56 for node C 36 has been designated a child port. Since the other port 56 has not been assigned, it must be connected to a parent node. Node C 36 then established node A 32 as its parent and node A 32 establishes node C 36 as its child. Since all connected ports for node A 32 are connected to child nodes, node A 32 is the root node.

Those of ordinary skill in the art will recognize that node C 36 could have been designated the root node in the above example. Whether node A 32 or node C 36 is established as the root node depends upon the timing of the YAMP and YAMC signals. Node A 32 was designated the root node for illustrative purposes.

Figure 2B:
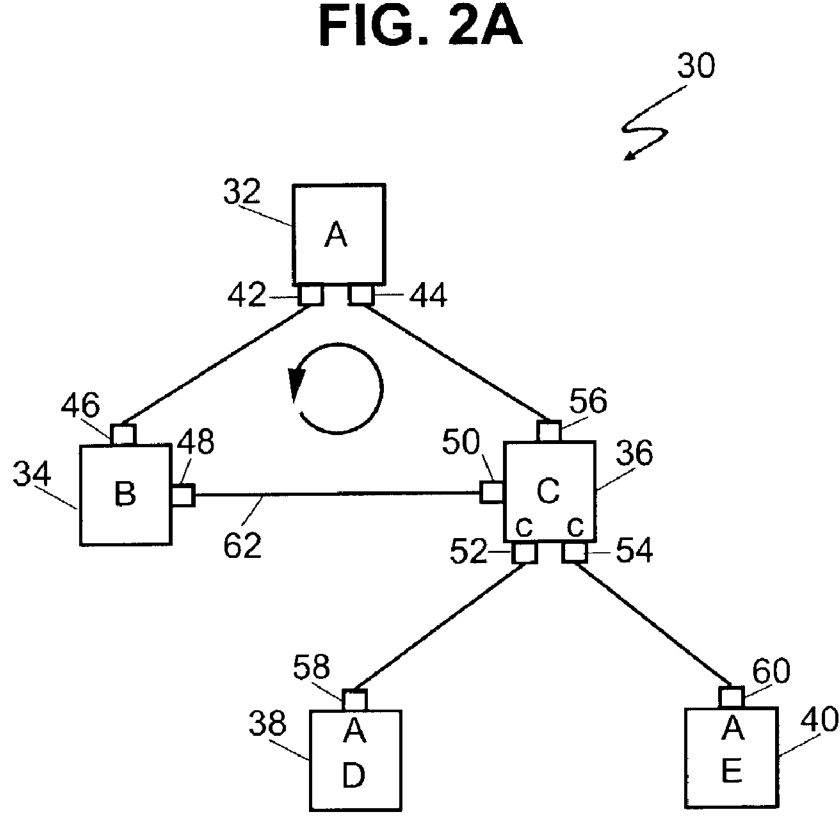
FIG. 2B is a block diagram that illustrates the tree identification process according to the IEEE1394-1995 Serial Bus Standard in a configuration having a loop.

Turning now to FIG. 2B, the tree identification process is illustrated in a configuration having a loop. FIG. 2B is the same as FIG. 2A, except that port 48 of node B 34 has been connected via link 62 to port 50 of node C 36, creating a loop. Tree identification for leaf nodes D 39 and E 40 proceeds as explained with respect to FIG. 2A. The parent-child relationships between node D 38 and node C 36 and between node E 40 and node C 36 are established. At this point, the tree identification process cannot proceed because node A 32, node B 34, and node C 36 are non-leaf nodes with two unassigned ports. Eventually, the tree-ID process times out and the bus remains inoperable.

According to the present invention, all ports of a node are allowed to remain connected to their neighbors, even in the presence of one or more loops. The present invention minimizes the number of isolated links, thus avoiding breaking a bus into two or more isolated buses. A loop is broken by internally isolating selected ports from the whole of the node. In effect, each port of a loop functions as a naked leaf node. Thus, each port participates fully in bus reset, tree-ID, and self-ID.

Figure 3A:
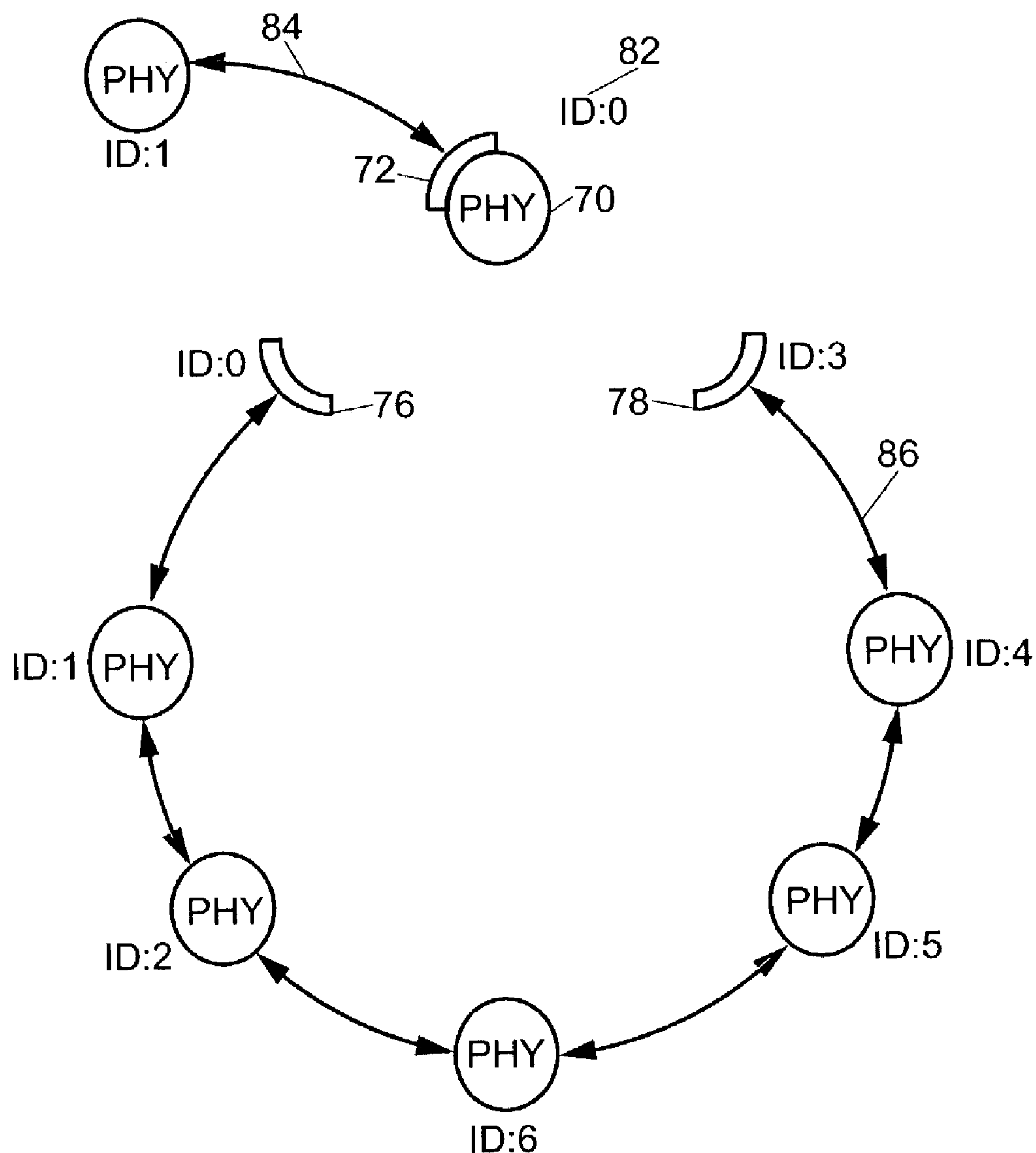
FIG. 3A is a block diagram that illustrates loop breaking in accordance with one embodiment of the present invention.

FIGS. 3A through 3E are block diagrams that illustrate loop breaking in a system comprising a bus compatible with the IEEE1394-1995 standard in accordance with one embodiment of the present invention. In the discussion that follows, nodes will be referred to as PHYs in accordance with the IEEE1394-1995 standard. In FIG. 3A, seven PHYs are represented. Initially, PHY 70 has at most one port 72 attached to its internal state machine. All other ports 76 and 78 are isolated from each other and the combined PHY 70 until they can be tested for loops. These ports appear as naked leaf nodes on the bus to which they are connected. While in this state, each port consumes a PhyID on its attached bus. Thy PHY 70 has at most one connected port and receives its actual ID 82 from that attached bus 84.

Figure 3B:
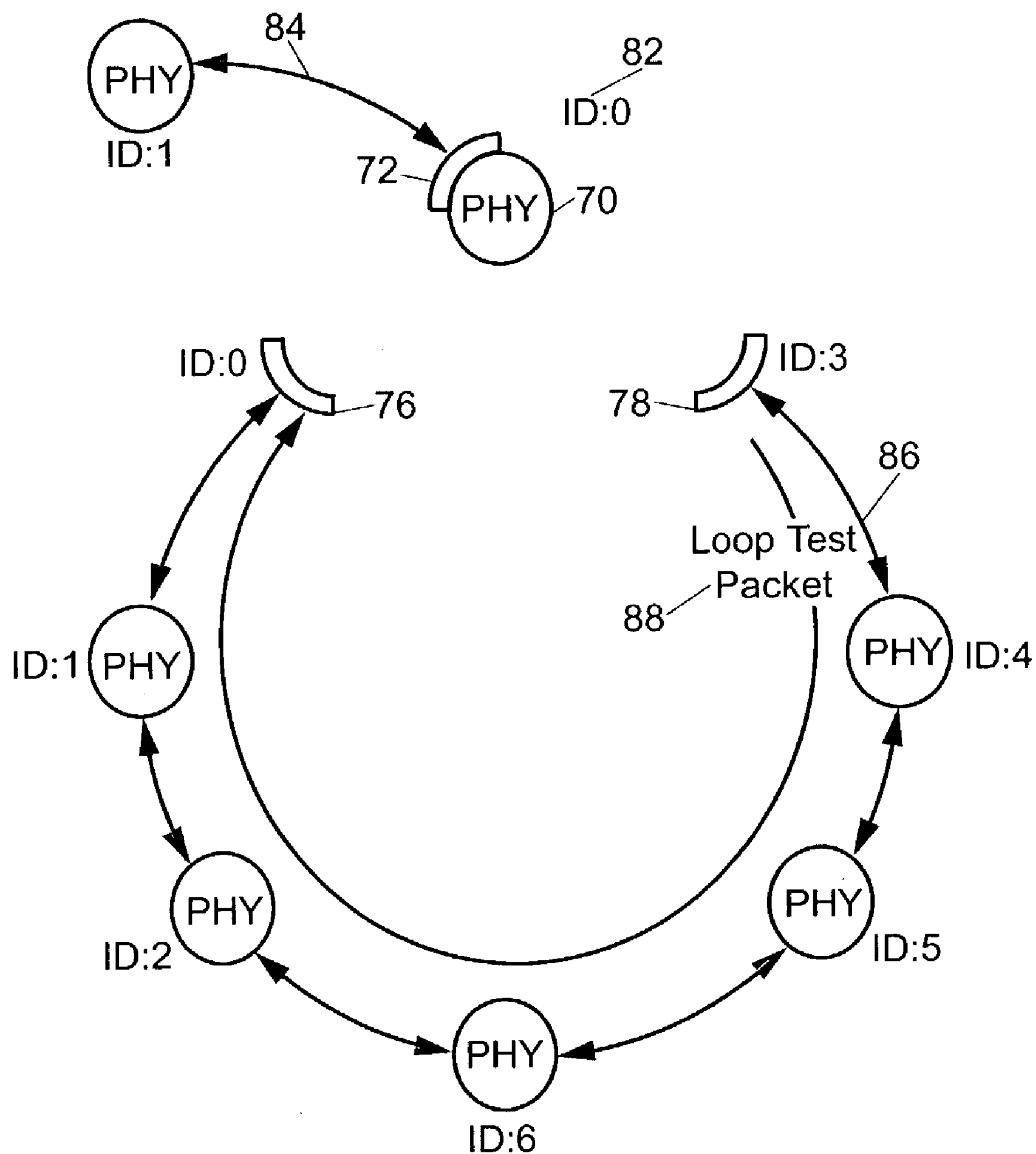
FIG. 3B is a block diagram that illustrates loop breaking in accordance with one embodiment of the present invention.
Figure 3C:
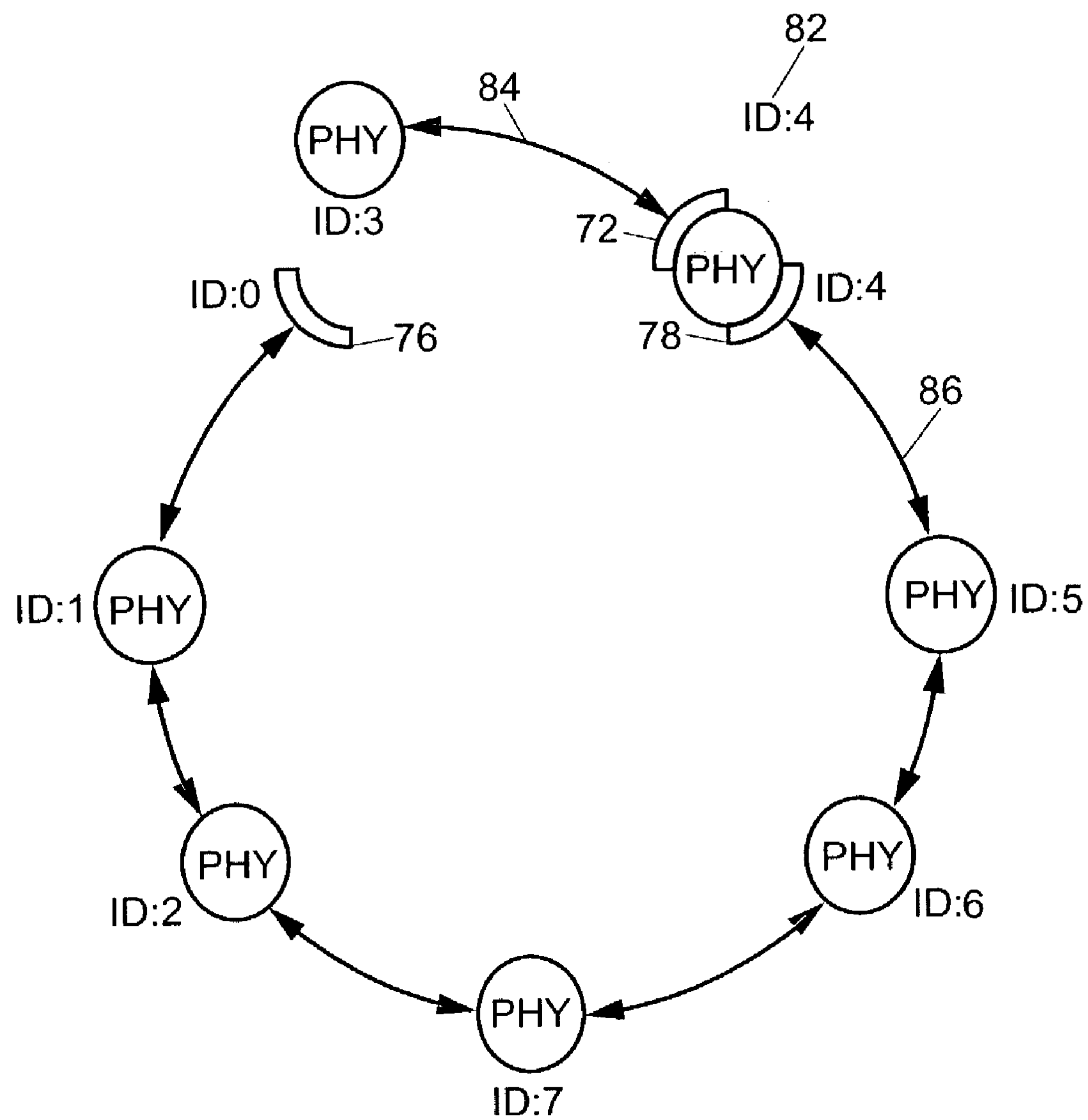
FIG. 3C is a block diagram that illustrates loop breaking in accordance with one embodiment of the present invention.

Turning now to FIG. 3B, a block diagram illustrating sending a loop test packet according to one embodiment of the present invention is presented. The main bus 84 is defined as the bus of which the tested and joined ports are members. The peer bus is defined as the bus of which the port under test is a member. The PHY 70 selects one of its untested ports 78, arbitrates for the attached peer bus 86, and begins transmitting a lop test packet (LTP) 88. If the LTP 88 is not received on any other active port attached to the main bus within a period of time, the selected port 78 is free of loops and can be joined to the combined PHY 70. The port 78 may be joined by issuing a bus reset, which will assign new PhyIDs. The joining of the port 78 and the PHY 70 is represented in FIG. 3C. Note the newly assigned PhyIDs.

Figure 3D:
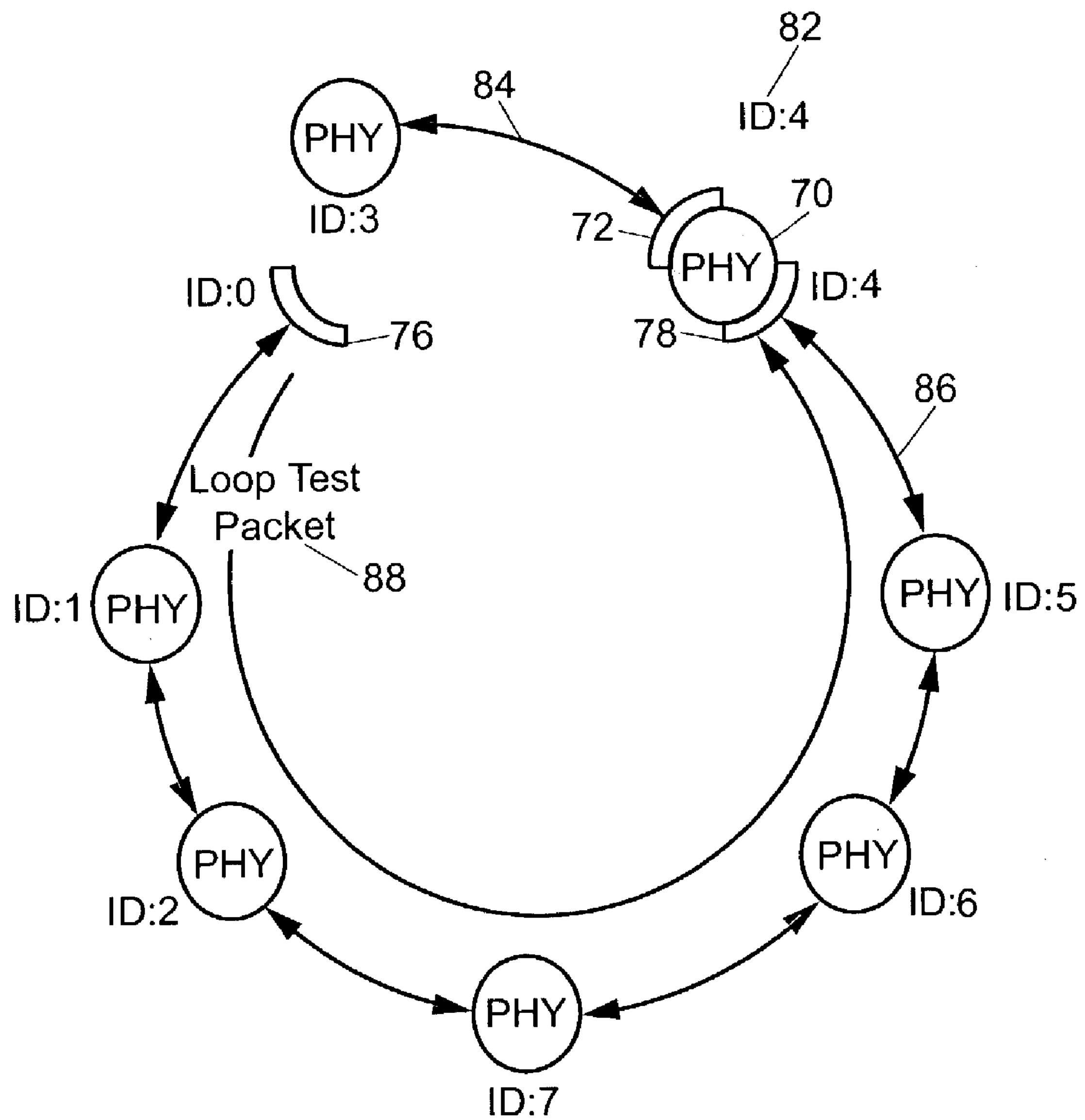
FIG. 3D is a block diagram that illustrates loop breaking in accordance with one embodiment of the present invention.
Figure 3E:
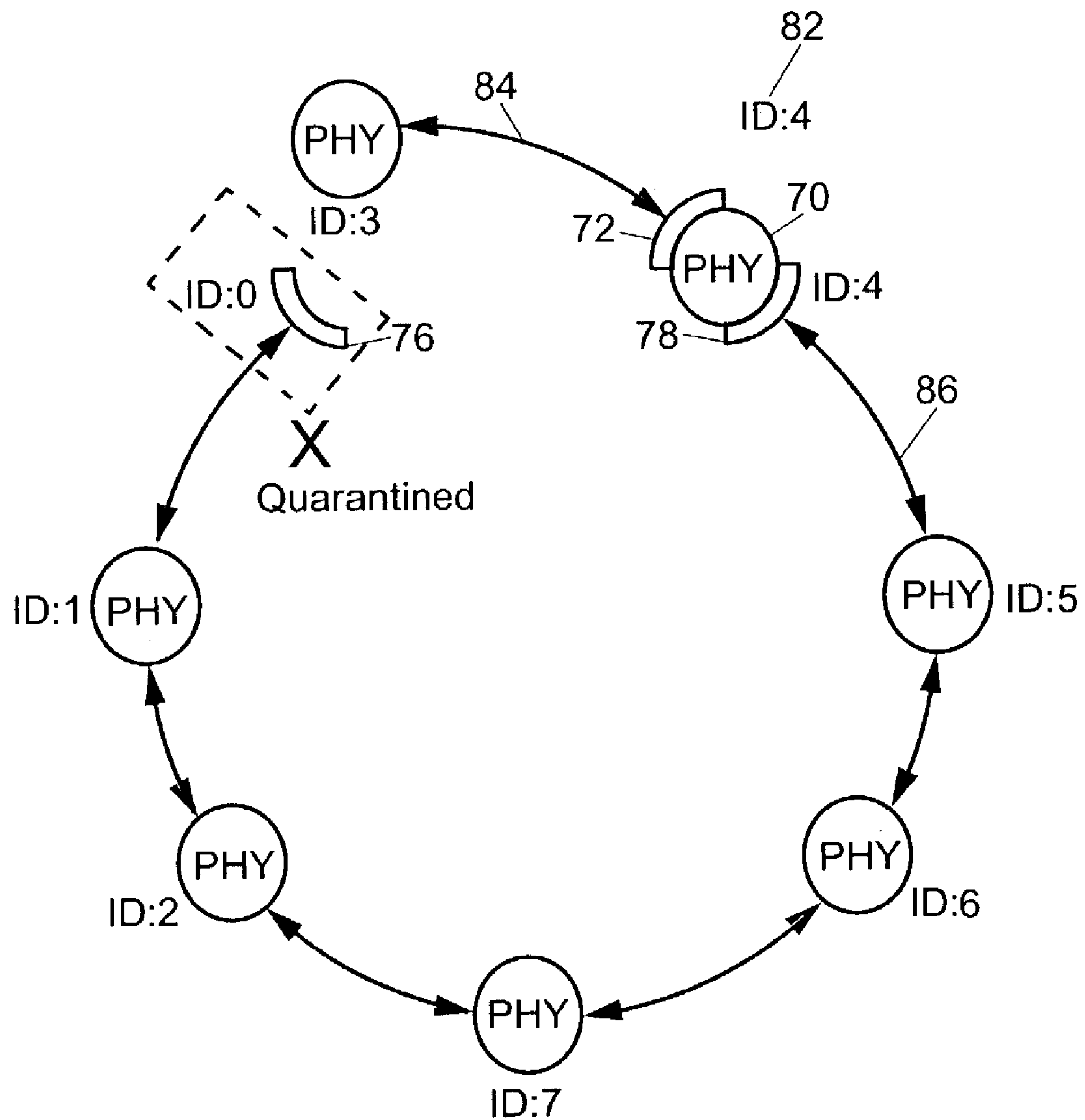
FIG. 3E is a block diagram that illustrates loop breaking in accordance with one embodiment of the present invention.

Turning now to FIG. 3D, a block diagram illustrating loop testing on a port having a loop is presented. After a join, the PHY 70 begins loop testing on the next untested port 76. If the LTP 88 is received on any other active port of the PHY 70, the port 76 is quarantined, as illustrated in FIG. 3E. However, cycle-free ports of the same PHY 70 remain connected to the combined PHY 70. Thus, port 72 remains connected to PHY 70.

Figure 4:
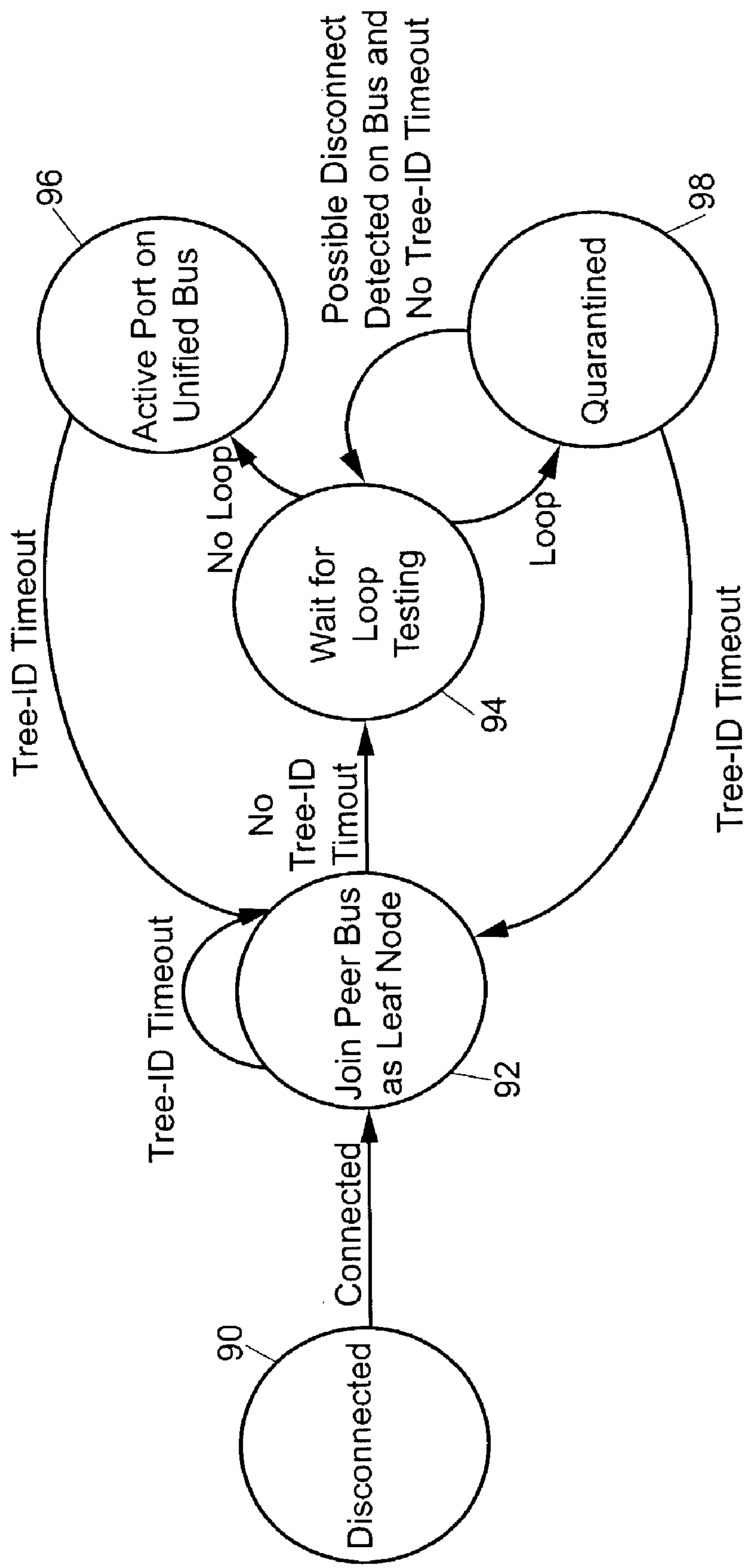
FIG. 4 is a state diagram that illustrates port actions in accordance with one embodiment of the present invention.

Turning now to FIG. 4, a state diagram illustrating port actions in accordance with one embodiment of the present invention is illustrated. Initially, an untested port is in a "Disconnected" state 90. When a connection is detected, a port attempt to join the peer bus, as represented by state 92. If the peer bus fails to complete tree-ID due to an external loop, the port remains unjoined, allowing the remaining joined ports to operate. After joining the peer bus as a leaf node, the port awaits loop testing service at state 94. If no loop is detected, the port joins the main bus at state 96 and remains active as long as no tree-ID timeout is detected. If a loop is found, the port is quarantined at state 98 until a disconnect event happens. The disconnect event may have removed the loop.

Figure 5:
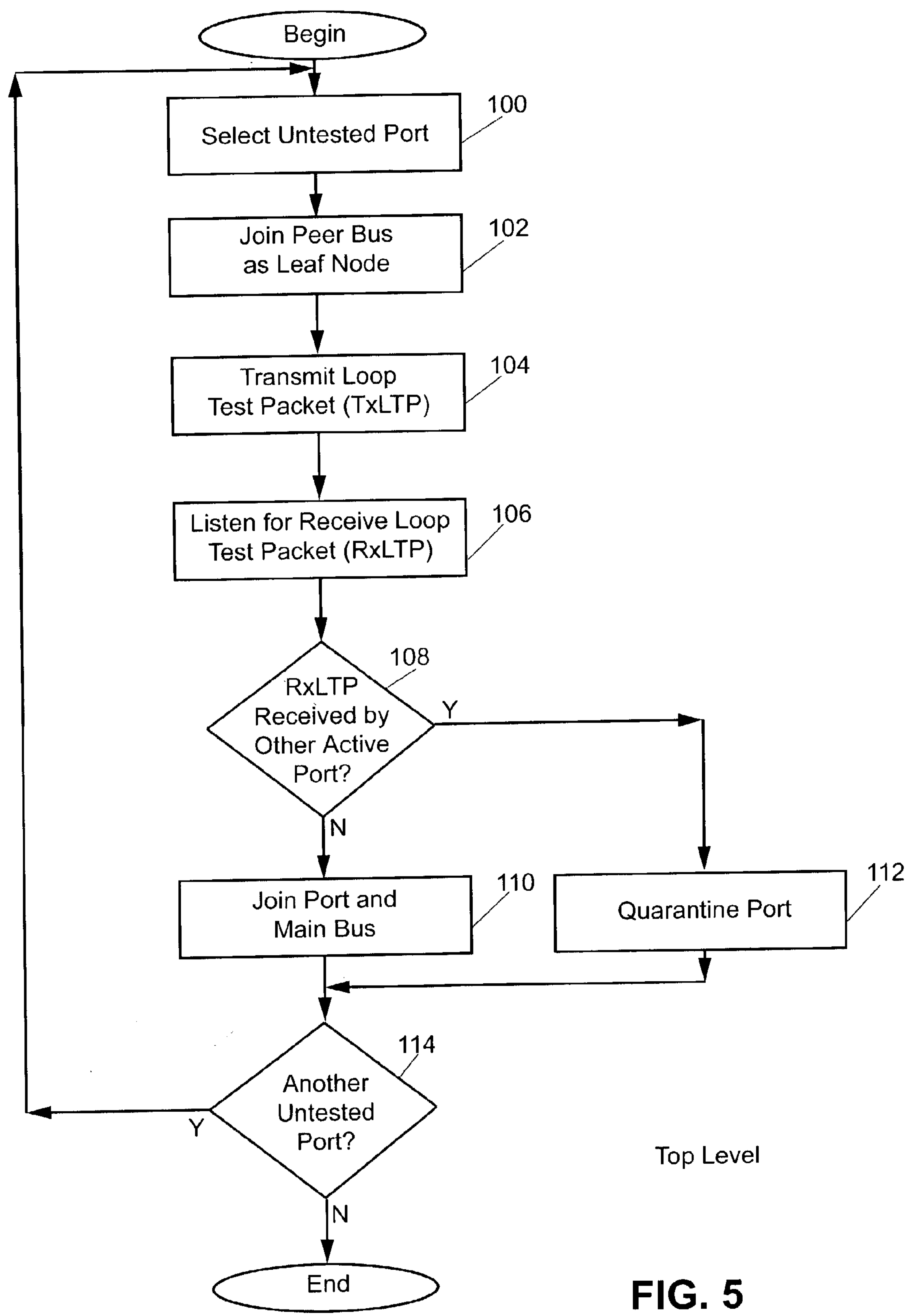
FIG. 5 is a flow diagram that illustrates port actions in accordance with one embodiment of the present invention.

Turning now to FIG. 5, a flow diagram illustrating port actions in accordance with one embodiment of the present invention is illustrated. This figure corresponds to the state diagram illustrated in FIG. 4. At reference numeral 100, an untested port is selected. At reference numeral 102, the port joins the peer bus as a leaf node. At reference numeral 104, the port arbitrates for the peer bus and transmits a loop test packet (TxLTP). At reference numeral 106, a second port listens for a receive loop test packet (RxLTP). The second port has been tested and is active. More than one port may be active at the same time. In this case, all active ports listen for the RxLTP. At reference numeral 108, a check is made to determine whether the RxLTP was received by the second port within a period of time. If the RxLTP was not received within the period of time, the port and the main bus are joined at reference numeral 110. If the RxLTP was received within the period of time, the first port is quarantined at reference numeral 112. At reference numeral 114, a check is made to determine whether other untested ports remain. If more untested ports remain, execution continues at reference numeral 100. This process continues until all ports have been tested for loops.

FIGS. 6–10 are flow diagrams that further illustrate these port actions.

Figure 6:
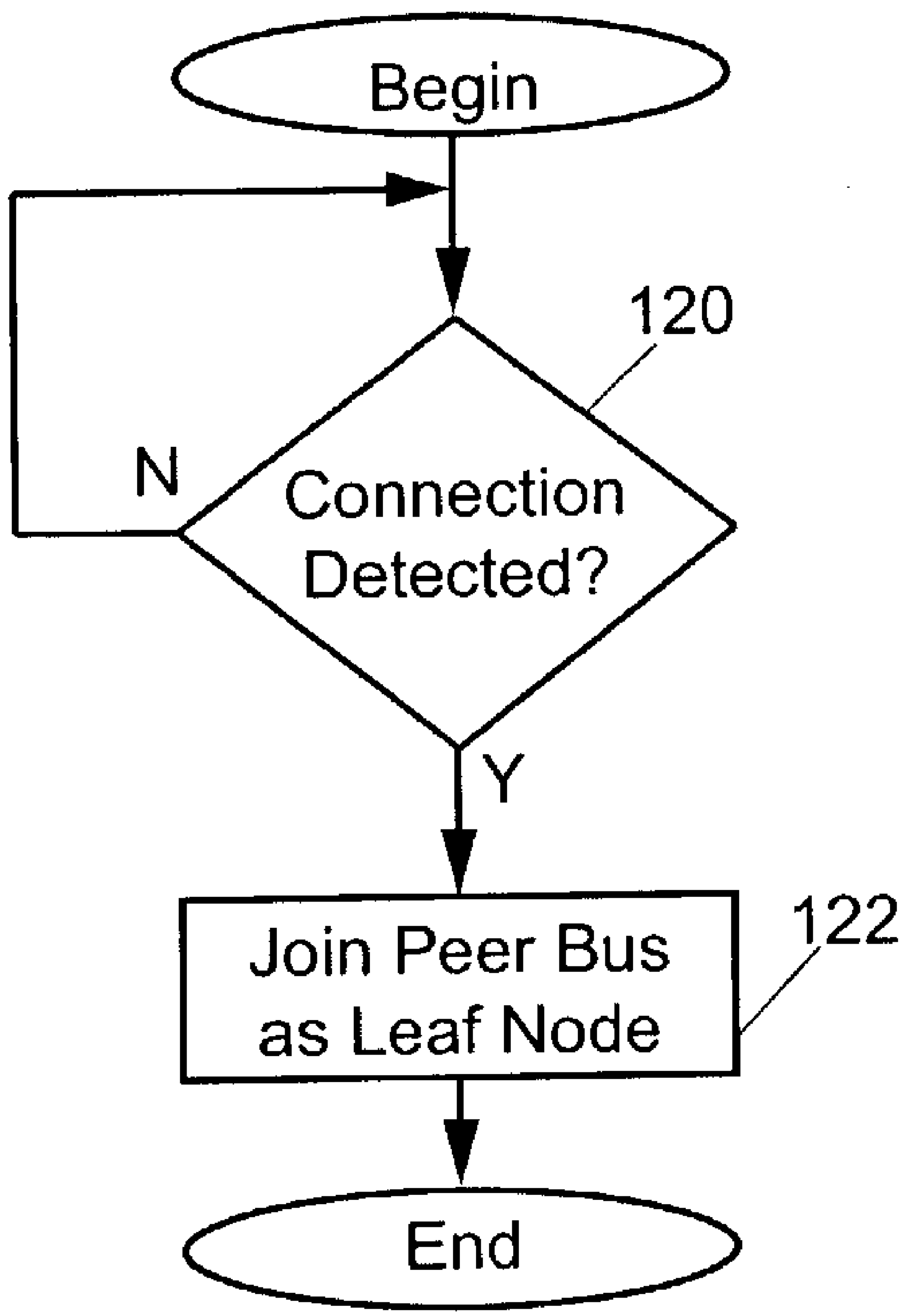
FIG. 6 is a flow diagram that illustrates the "Disconnected" state of a port in accordance with one embodiment of the present invention.

FIG. 6 illustrates the "Disconnected" state of a port in accordance with one embodiment of the present invention.

A port is initially not connected to the peer bus. At reference numeral 120, a check is made to determine whether a new connection has been detected. When a new connection has been detected, the port joins the peer bus as a leaf node at reference numeral 122.

Figure 7:
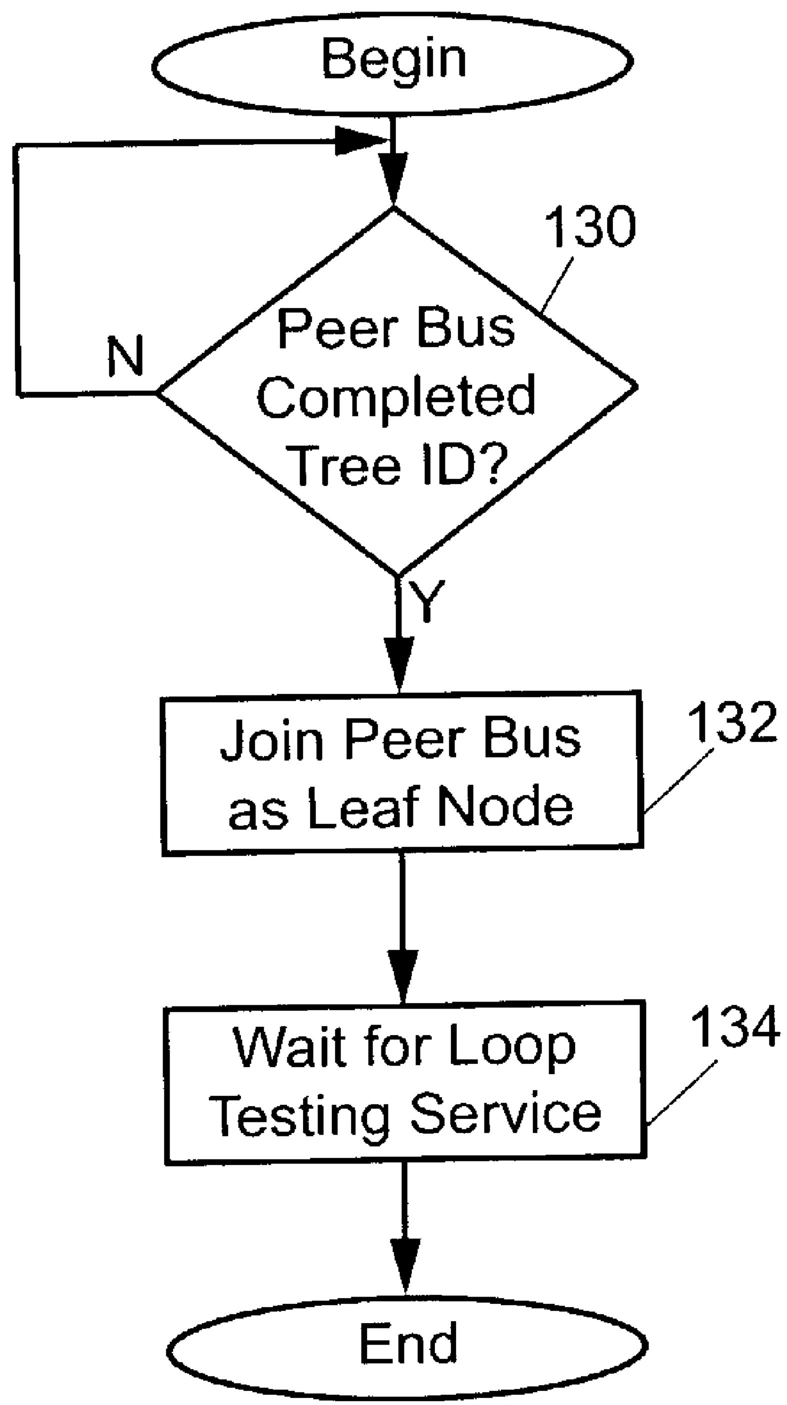
FIG. 7 is a flow diagram that illustrates the "Join peer bus as a leaf node" state of a port in accordance with one embodiment of the present invention.

FIG. 7 illustrates the "Join peer bus as a leaf node" state of a port in accordance with one embodiment of the present invention. At reference numeral 130, a check is made to determine whether the peer bus has completed tree-ID. When tree-ID has completed, an attempt is made to join the port to the peer bus as a leaf node by completing the Self-ID phase at reference numeral 132. After the port has been joined to the peer bus, the port waits for loop testing service at reference numeral 134.

Figure 8:
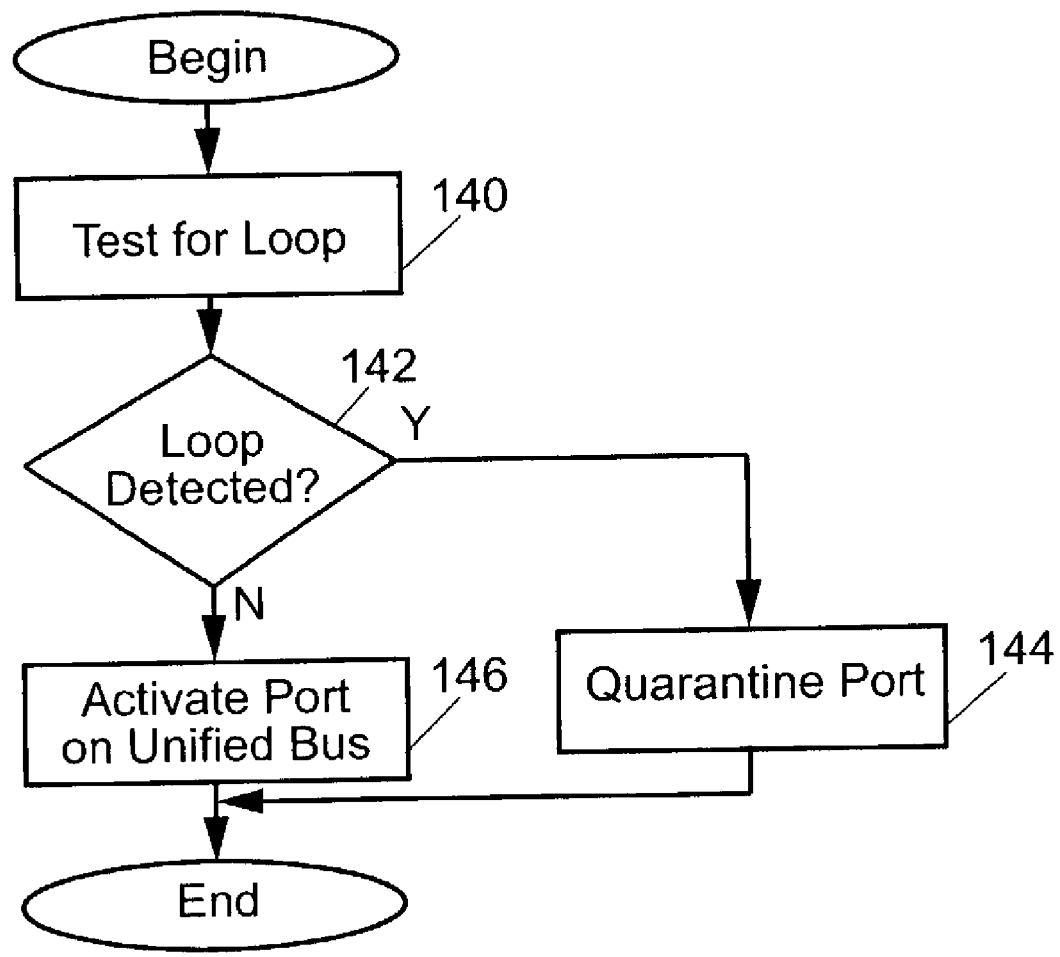
FIG. 8 is a flow diagram that illustrates the "Wait for loop testing" state of a port in accordance with one embodiment of the present invention.

FIG. 8 illustrates the "Wait for loop testing" state of a port in accordance with one embodiment of the present invention. At reference numeral 140, the port is tested for loops. At reference numeral 142, a check is made to determine whether a loop has been detected within a period of time. At reference numeral 144, the port is quarantined when a loop is detected. At reference numeral 146, the port is activated on a unified bus when a loop is not detected within the period of time.

Figure 9:
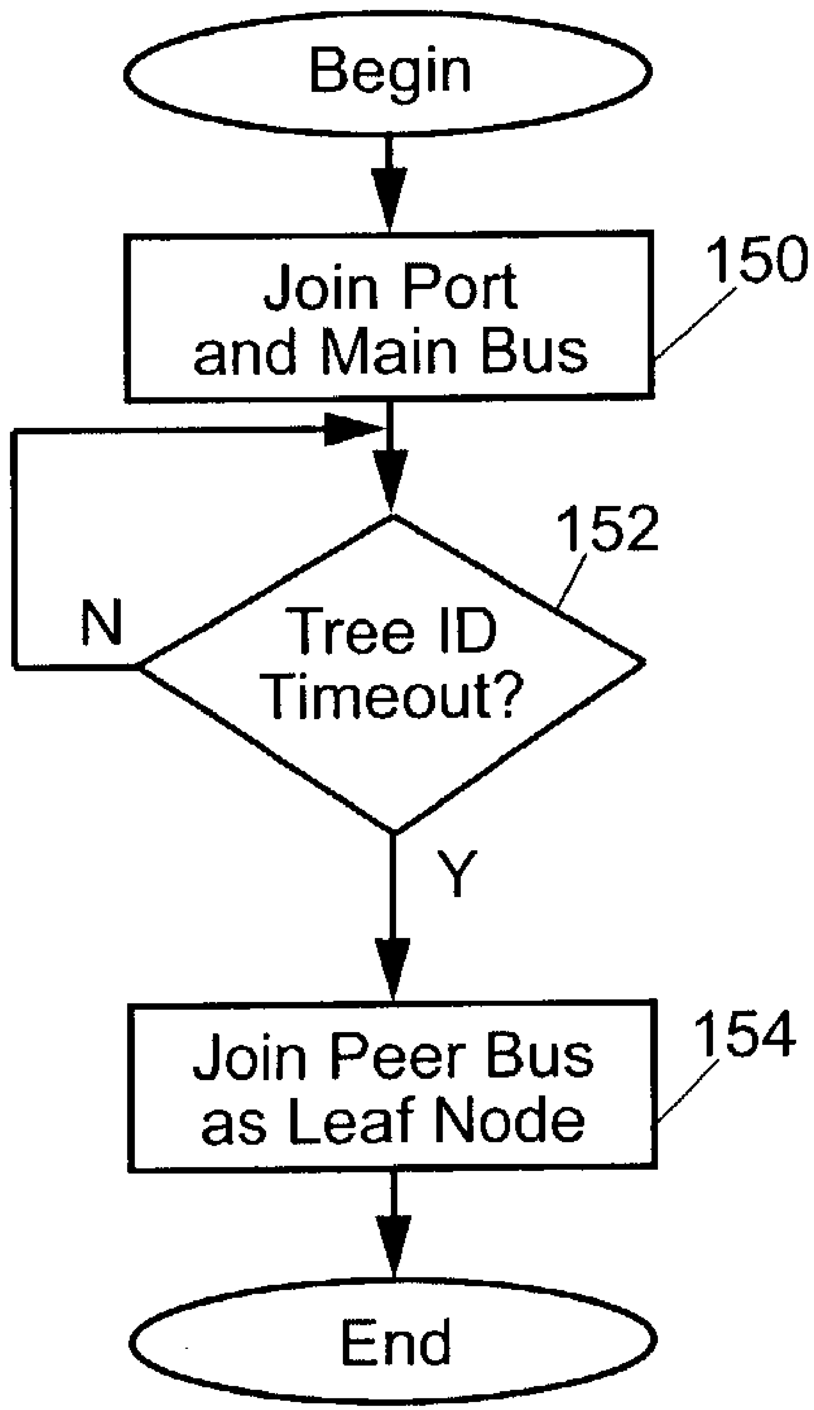
FIG. 9 is a flow diagram that illustrates the "Active port on unified bus" state in accordance with one embodiment of the present invention.

FIG. 9 illustrates the "Active port on unified bus" state in accordance with one embodiment of the present invention. At reference numeral 150, the port and the main bus are joined. At reference numeral 152, a check is made to determine whether a tree-ID timeout has been detected. If a tree-ID timeout has been detected, the port is no longer associated with the main bus and at reference numeral 154, the port is joined to the peer bus as a leaf node.

Figure 10A:
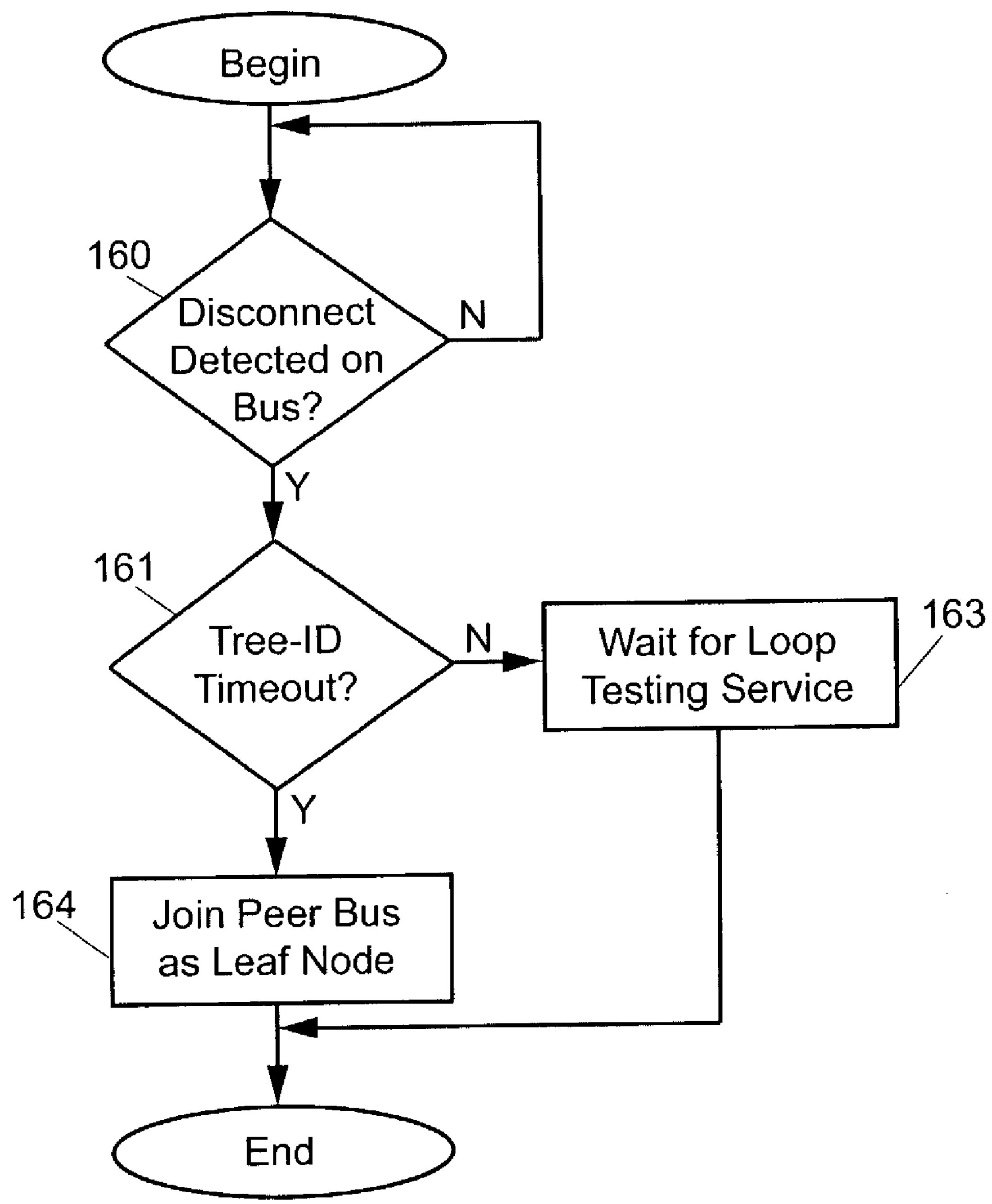
FIG. 10A is a flow diagram that illustrates the "Quarantined" state of a port in accordance with one embodiment of the present invention.

FIG. 10A illustrates the "Quarantined" state of a port in accordance with one embodiment of the present invention. At reference numeral 160, a check is made to determine whether a disconnect has been detected on the bus. A disconnect is signaled with a bus reset event. If a disconnect has not been detected, execution continues at reference numeral 160. If a disconnect has been detected, a check is made at reference numeral 161 to determine whether a tree-ID timeout has occurred. At reference numeral 163, if a tree-ID timeout has not occurred, the port enters the "wait for loop testing service" state described above. If a tree-ID timeout has occurred, the port is joined to the peer bus as a leaf node at reference numeral 164.

Figure 10B:
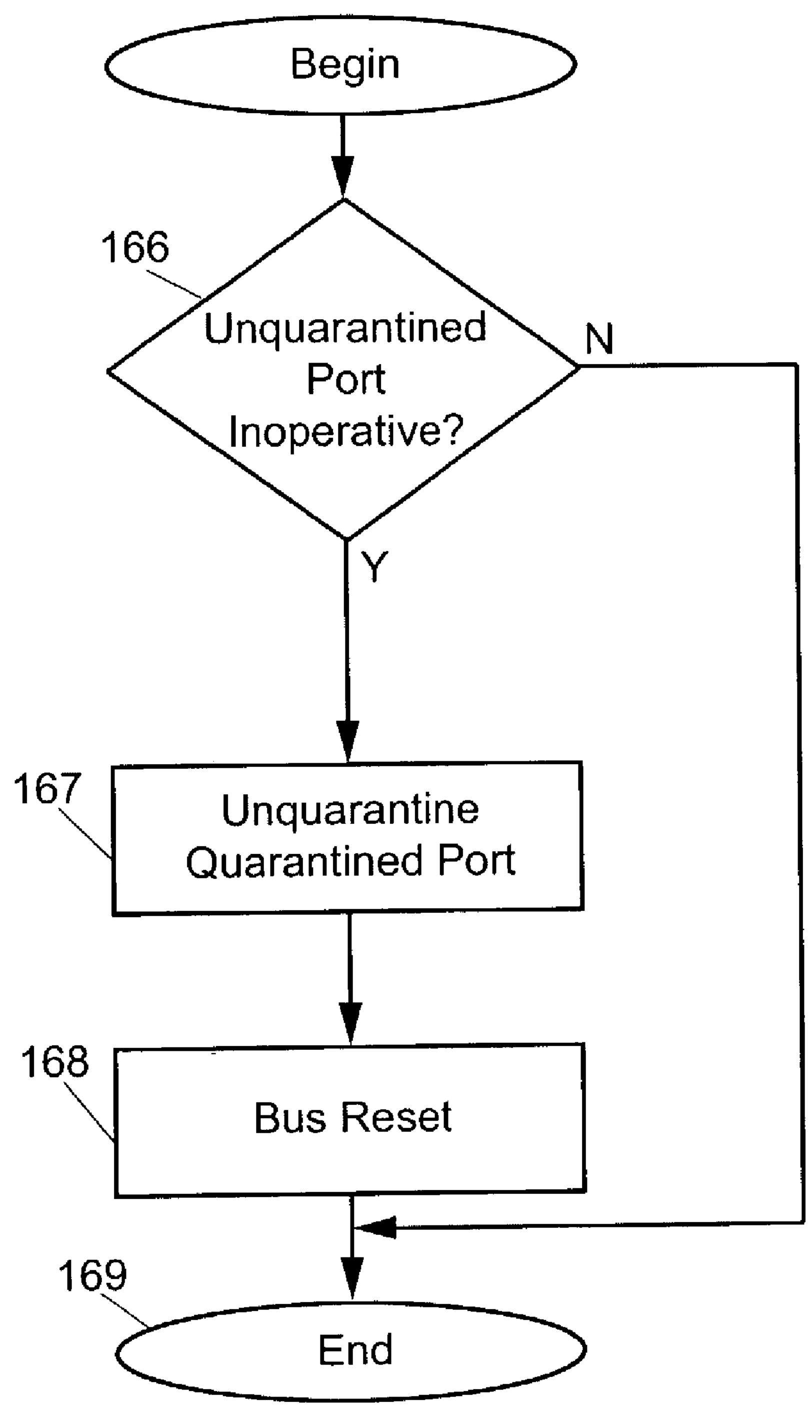
FIG. 10B is a flow diagram that illustrates unquarantining a quarantined port in accordance with one embodiment of the present invention.

Turning now to FIG. 10B, a method for unquarantining a quarantined port in accordance with one embodiment of the present invention is presented. This embodiment addresses the situation where a previously operational port later becomes inoperative. The port may become inoperative, for example, when a device is physically disconnected or put in a suspend state. At reference numeral 166, a check is made to determine whether an unquarantined port has become inoperative. If the port has not become inoperative, execution continues at reference numeral 169. If the port has become inoperative, a quarantined port is unquarantined at reference numeral 167. At reference numeral 168, a bus reset is issued and the bus is reconfigured, thereby allowing bus operation to continue.

Figure 11:
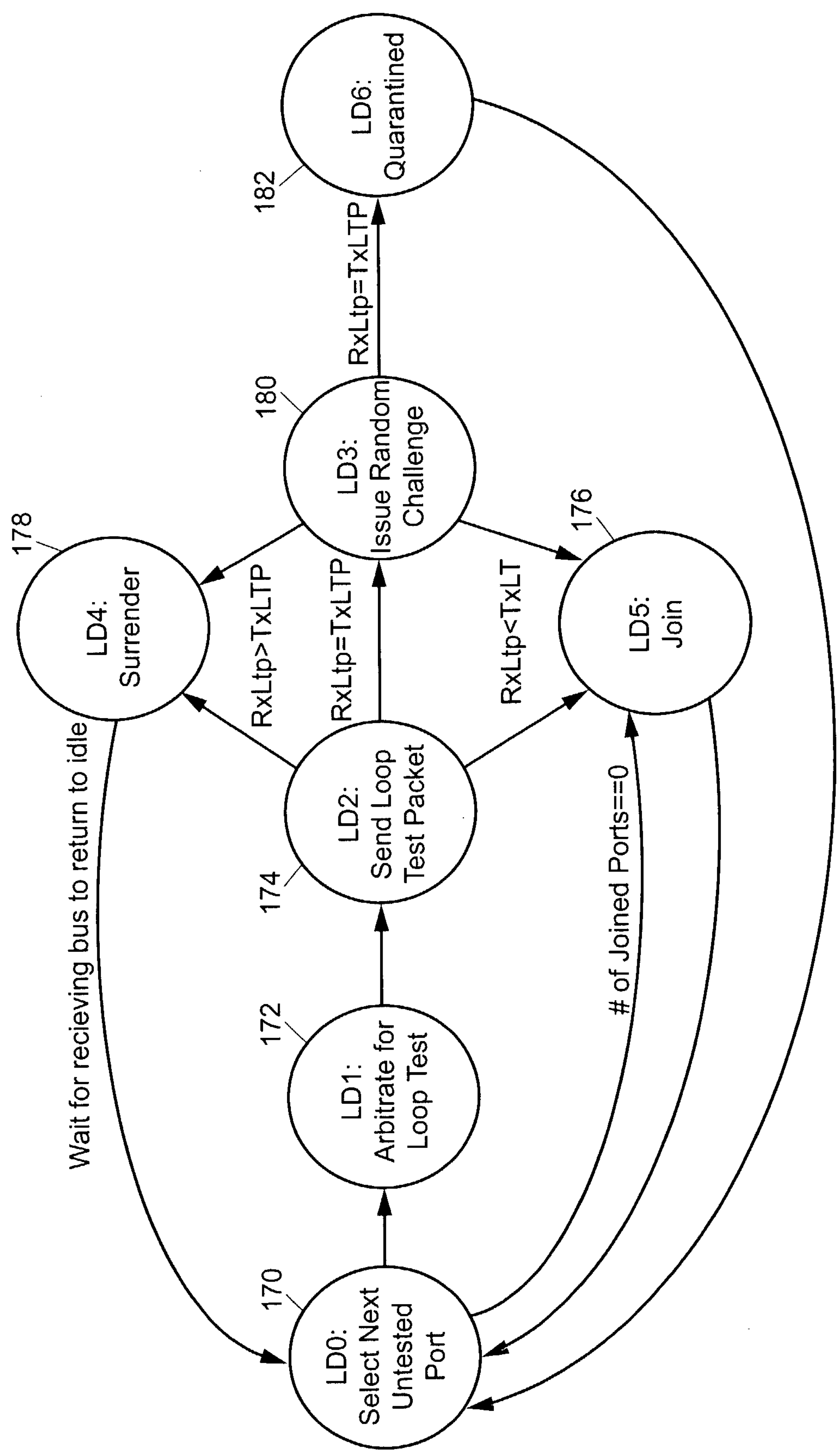
FIG. 11 is a detailed state diagram that illustrates the loop detection sequence in accordance with one embodiment of the present invention.

Turning now to FIG. 11, a detailed state diagram illustrating the loop detection sequence in accordance with one embodiment of the present invention is presented. The illustration of this invention with respect to the IEEE1394-1995 standard is not intended to be limiting in any way. Those of ordinary skill in the art will recognize that the invention may be applied to other buses as well.

"Select Next Untested Port" State

At reference numeral 170, the next untested port is selected. According to a preferred embodiment, ports associated with higher speed connections are chosen before lower speed connections. Those of ordinary skill in the art will recognize that selecting ports in this way increases the likelihood of "removing" the lowest speed cable in the event a loop is detected. While the cable or other physical connection itself is not removed, the loop created by a cable is broken by isolating the particular port involved in the loop.

"Arbitrate for Loop Test" State

At reference numeral 172, the PHY initiates arbitration for one or both of the buses required to perform loop testing. According to one embodiment of the present invention, if both the main and peer buses are multi-node buses, arbitration is initiated simultaneously on both buses and the loop testing is initiated on the first bus to be grated. If one bus is a single node bus and the other is a multi-node bus, arbitration is performed on the multi-node bus first. If both buses are single node buses, arbitration begins on both and loop testing is initiated on the first bus granted. This process of performing arbitration on multiple buses simultaneously reduces the probability of requiring a relatively long bus reset when joining ports to a PHY.

Send Loop Test Packet State

At reference numeral 174, the PHY transmits a loop test packet including a unique identifier. The transmitted identifier is denoted "TxLTP". While transmitting the LTP, the PHY listens for any packet received on the main bus or the peer bus within a period of time. The received identifier is denoted "RxLTP".

According to one embodiment of the present invention, the identifier includes the PHY ID and port ID of the transmitting port, the PHY ID and port ID of the receiving port, the speed of the untested port and a Globally Unique Identifier (GUID). According to another embodiment of the present invention, the identifier includes the PHY ID and port ID of the transmitting port, the PHY ID and port ID of the receiving port, the speed of the untested port and a random number.

The discussion of particular unique identifiers is not intended to be limiting in any way. Those of ordinary skill in the art will recognize there are many other ways of forming unique identifiers. These other ways of forming unique identifiers may include, for example, other combinations of the PHY ID and port ID of the transmitting port, the PHY ID and port ID of the receiving port, the speed of the untested port, a Globally Unique Identifier (GUID), and a random number.

The identifier is used to determine if a particular LTP was sent by the local PHY or by another PHY in the network. Additionally, the identifier prevents two or more PHYs from simultaneously joining ports, thus creating a loop. A loop is avoided by using a predetermined criteria and the unique identifiers from multiple PHYs to establish a "winning" PHY and "losing" PHY(s). Since more than two PHYs could be performing loop testing simultaneously, there could be more than one "losing" PHY. The winning PHY joins the port to the main bus, while the losing PHY(s) surrender the buses. The PHY waits at least a subaction gap (as defined by the IEEE1394-1995 standard) after sending a LTP. If the PHY has either not seen an RxLTP or has received one with a lower ID, a loop does not exist and the port can be safely joined to the main bus.

Join State

At reference numeral 176, the port under test is joined to the main bus. According to a preferred embodiment of the present invention, the port is joined by first waiting a period of time for the PHY to win arbitration of both the main bus and the peer bus. If arbitration of both buses is won within the period of time, a relatively short bus reset is issued. If arbitration of both buses is not won within the period of time, a relatively long bus reset is issued. After the port as been joined, the next untested port is selected and tested for loops.

Surrender State

The surrender state is indicated by reference numeral 178. To prevent both PHYs from joining simultaneously, the PHY with the lower ID surrenders and waits until the receiving bus returns to idle, which may occur after a bus reset used by the winning PHY to join a port. Once the port surrenders the buses, the next untested port is selected and tested for loops.

Issue Random Challenge State

At reference numeral 180, the PHY has received the same identifier as the one transmitted. Consequently, a loop may exist. Alternatively, another PHY may have chosen the same ID. At reference numeral 180, the LTP is modified to include a ransom number to reduce the risk of a false loop detection in the case where two PHYs use the same initial identifier. The modified packet is sent and the same criteria used in the "Send Loop Test Packet" state 174 is used to determine whether to surrender bus control, or to join the port to the main bus.

Figure 12:
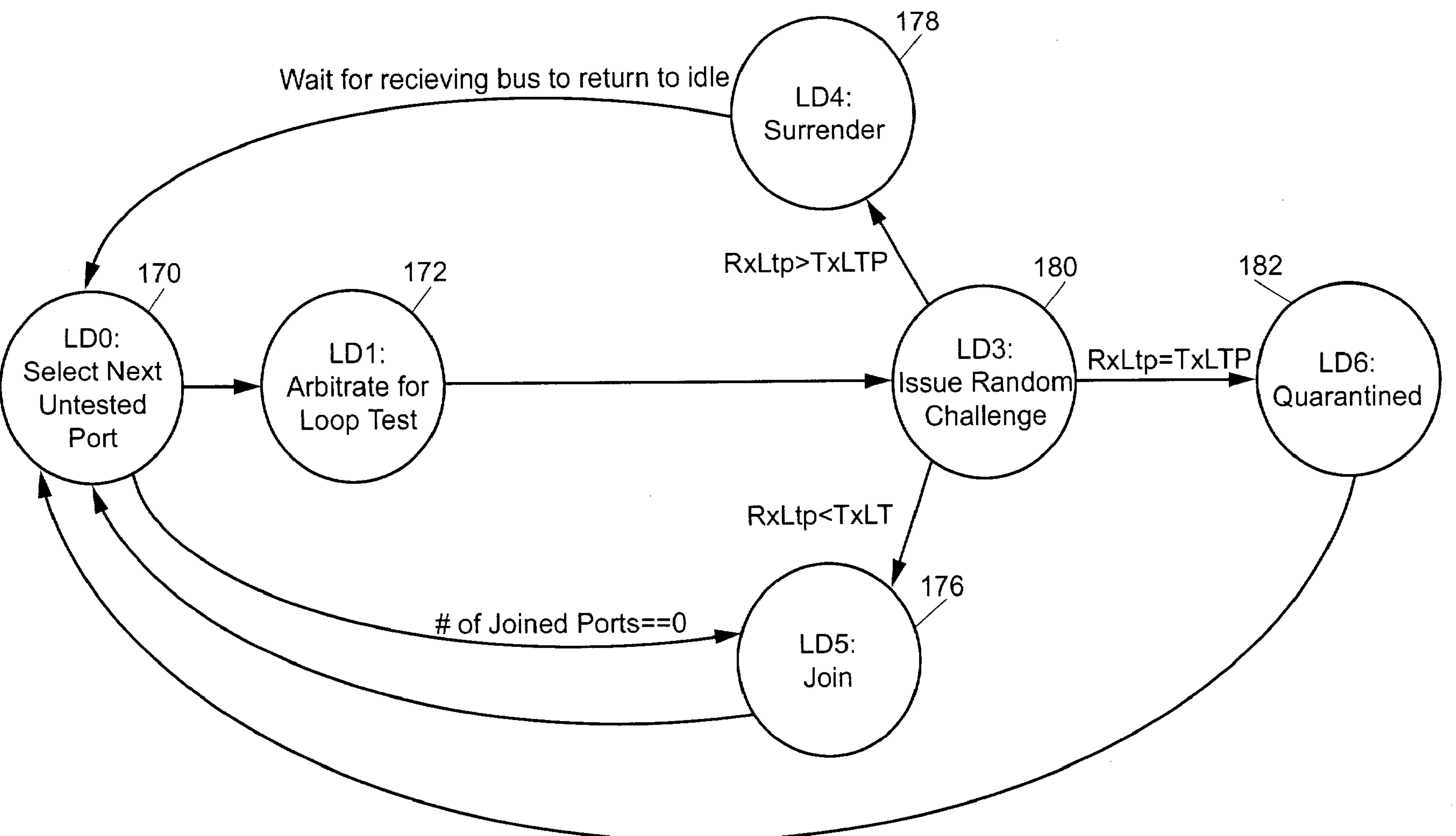
FIG. 12 is a detailed state diagram that illustrates the loop detection sequence in accordance with one embodiment of the present invention.

According to another embodiment of the present invention, the original LTP is modified to include a random challenge, thus requiring only one loop test per port. This embodiment is illustrated in FIG. 12.

Quarantined State

At reference numeral 182, if the PHY received the same identifier as the one it transmitted, a loop exists and the port is quarantined. Once the port is quarantined, the next untested port is selected and tested for loops. This process continues until all ports of the PHY have been tested.

The criteria used to determine what action to take based upon a comparison of a TxLTP and an RxLTP is not intended to be limiting in any way. Those of ordinary skill in the art will recognize that other criteria may be used. For example, a port might be joined if a first criteria is met with respect to the TxLTP and the RxLTP. Also, the decision to issue a random challenge or to quarantine the bus may be based on a third criteria with respect to the TxLTP and the RxLTP. This third criteria may include determining whether the packets are equivalent, meaning the same or similar.

To aid in an understanding of the present invention, flow diagram representations of the state diagram in FIG. 11 are now presented. FIGS. 13A–13E further illustrate loop detection in accordance with one embodiment of the present invention.

Figure 13A:
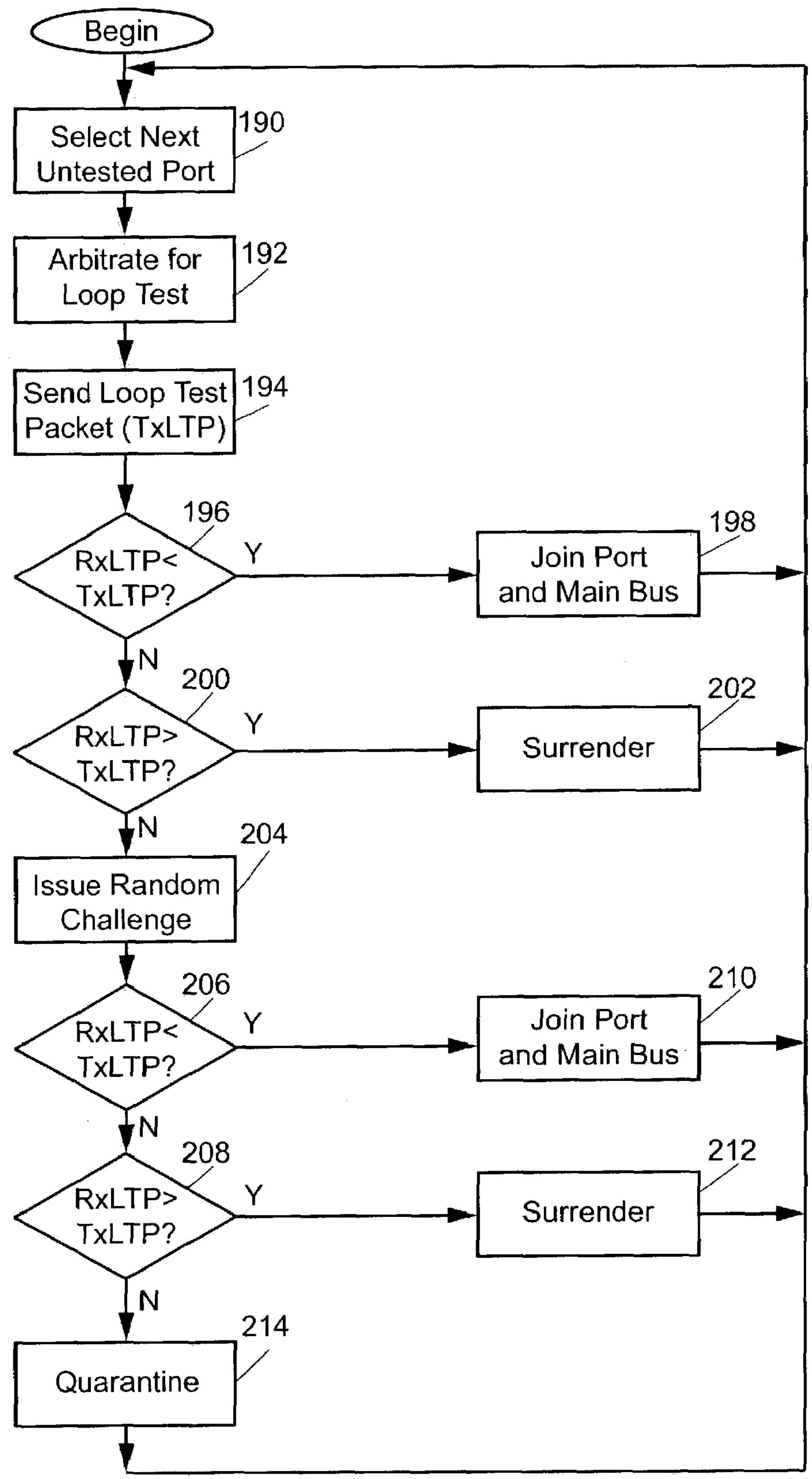
FIG. 13A is a detailed flow diagram that illustrates the lop detection sequence in accordance with one embodiment of the present invention.

Turning now to FIG. 13A, a detailed flow diagram illustrating loop detection in accordance with the present invention is presented. At reference numeral 190, the next untested port is selected. At reference numeral 192, the PHY arbitrates for loop test. At reference numeral 194, a loop test packet containing a unique identifier is sent. At reference numeral 196, the unique identifiers in the TxLTP and the RxLTP are compared. If the unique identifier in the RxLTP is less than the unique identifier in the TxLTP or if the RxLTP is not received within a period of time, the port is joined to the main bus at reference numeral 198 and testing of the next port is initiated at reference numeral 190. If the unique identifier in the RxLTP is greater than or equal to the unique identifier in the TxLTP, the unique identifiers are compared again at reference numeral 200. If the unique identifier in the RxLTP is greater than the unique identifier in the TxLTP, the PHY surrenders control of the buses at reference numeral 202 and testing of the next port is initiated at reference numeral 190.

Figure 13B:
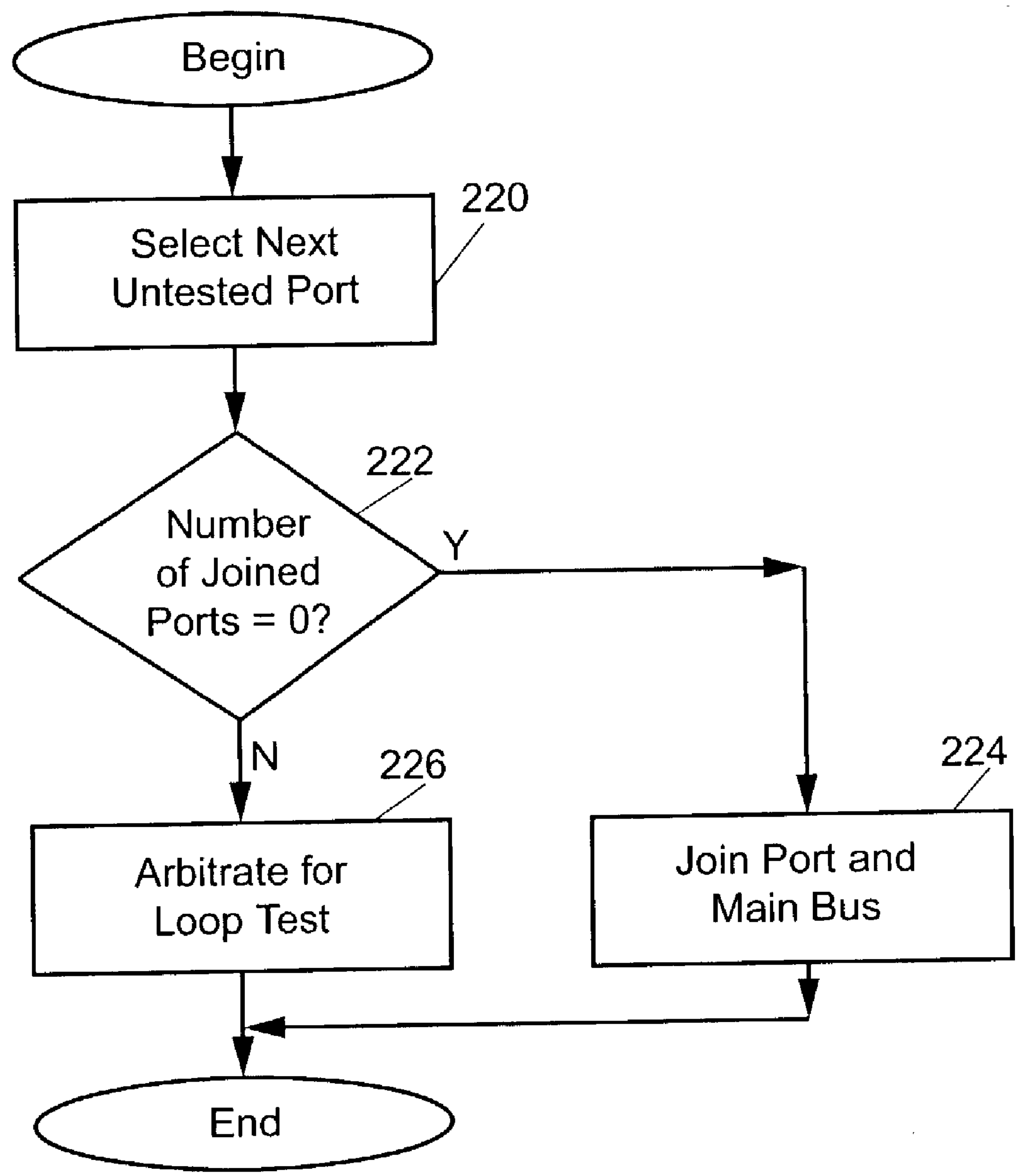
FIG. 13B is a detailed flow diagram that illustrates selecting an untested port in accordance with one embodiment of the present invention.

Referring now to FIG. 13B, a flow diagram illustrating selecting an untested port in accordance with one embodiment of the present invention is presented. At reference numeral 220, an untested port is selected. Since a leaf node cannot be part of a loop, the first connected port of a PHY may bypass loop testing and join the main bus immediately. At reference numeral 222, a check is made to determine whether the number of joined ports is zero. If the number of joined ports is zero, the port and the main bus are joined at reference numeral 224. If the number of joined ports is not zero, arbitration for loop test is performed at reference numeral 226.

Figure 13C:
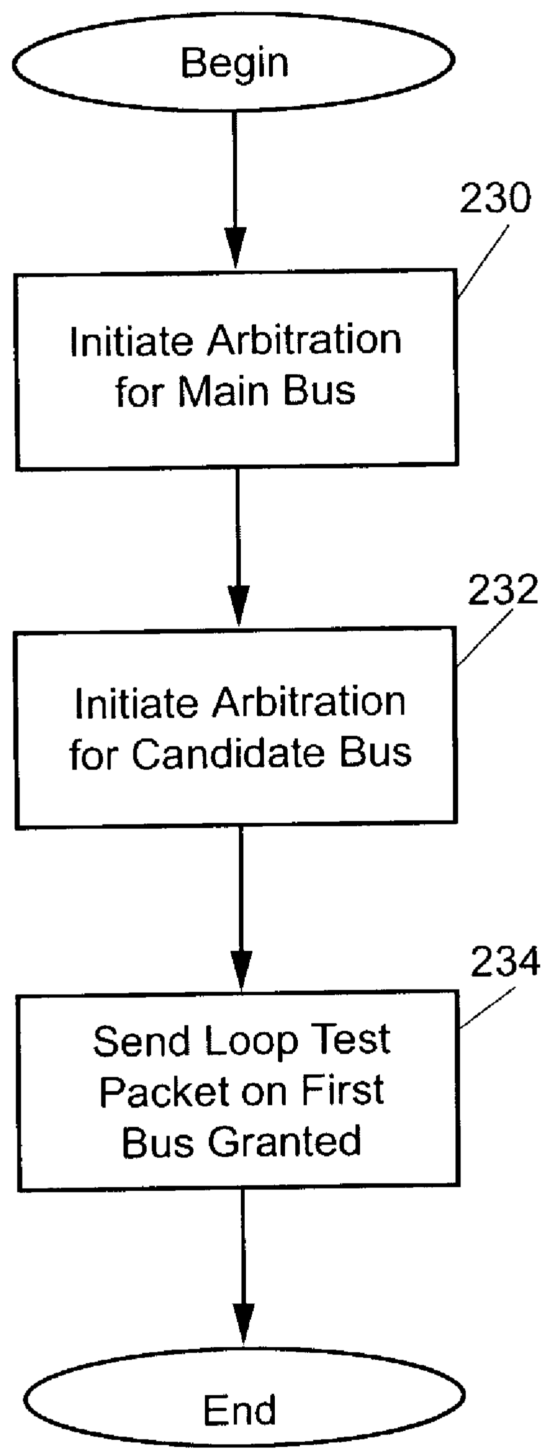
FIG. 13C is a detailed flow diagram that illustrates arbitrating for loop test in accordance with one embodiment of the present invention.

Referring now to FIG. 13C, a flow diagram illustrating arbitrating for loop test in accordance with one embodiment of the present invention is presented. According to one embodiment of the present invention, arbitration for the main bus is initiated at reference numeral 230. As discussed above, arbitration for the main bus is performed to allow a short bus reset for joining the port to the main bus. At reference numeral 232, arbitration for the peer bus is initiated. At reference numeral 234, a loop test packet is sent on whatever bus is granted first. The order of reference numerals 232 and 230 is not important. Arbitration may be initiated for both buses in series, or arbitration may be initiated for both buses in parallel.

Figure 13D:
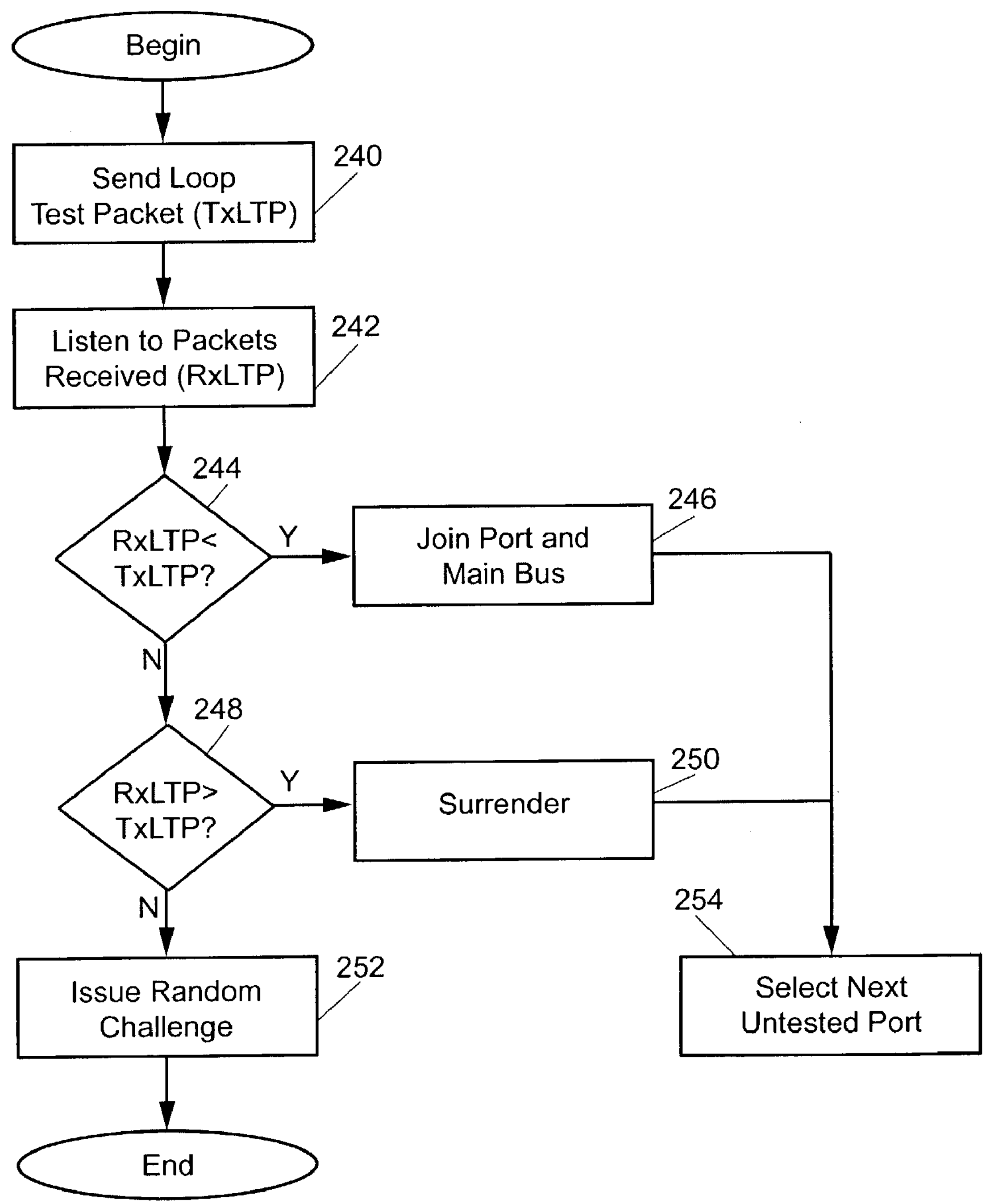
FIG. 13D is a detailed flow diagram that illustrates sending a loop test packet in accordance with one embodiment of the present invention.

Referring now to FIG. 13D, a flow diagram illustrating sending a loop test packet in accordance with one embodiment of the present invention is presented. If arbitration for the main bus was granted first, a loop test packet is sent from a tested port connected to the main bus. If arbitration for the peer bus was granted first, a loop test packet is sent from the port under test, which is connected to the peer bus. To prevent obsfucation of the present invention, the following disclosure will refer to the case in which arbitration on the peer bus is granted first. However, those of ordinary skill in the art will recognize that the embodiments of the present invention disclosed herein may apply to the case in which arbitration for the main bus is granted first, in which case the loop test packet sending and receiving roles of the port under test and an active port are reversed.

At reference numeral 240, a loop test packet is sent on the peer bus. At reference numeral 242, the PHY listens for packets received by any port connected to the main bus. The packets are compared as discussed with respect to FIG. 13A, above.

Figure 13E:
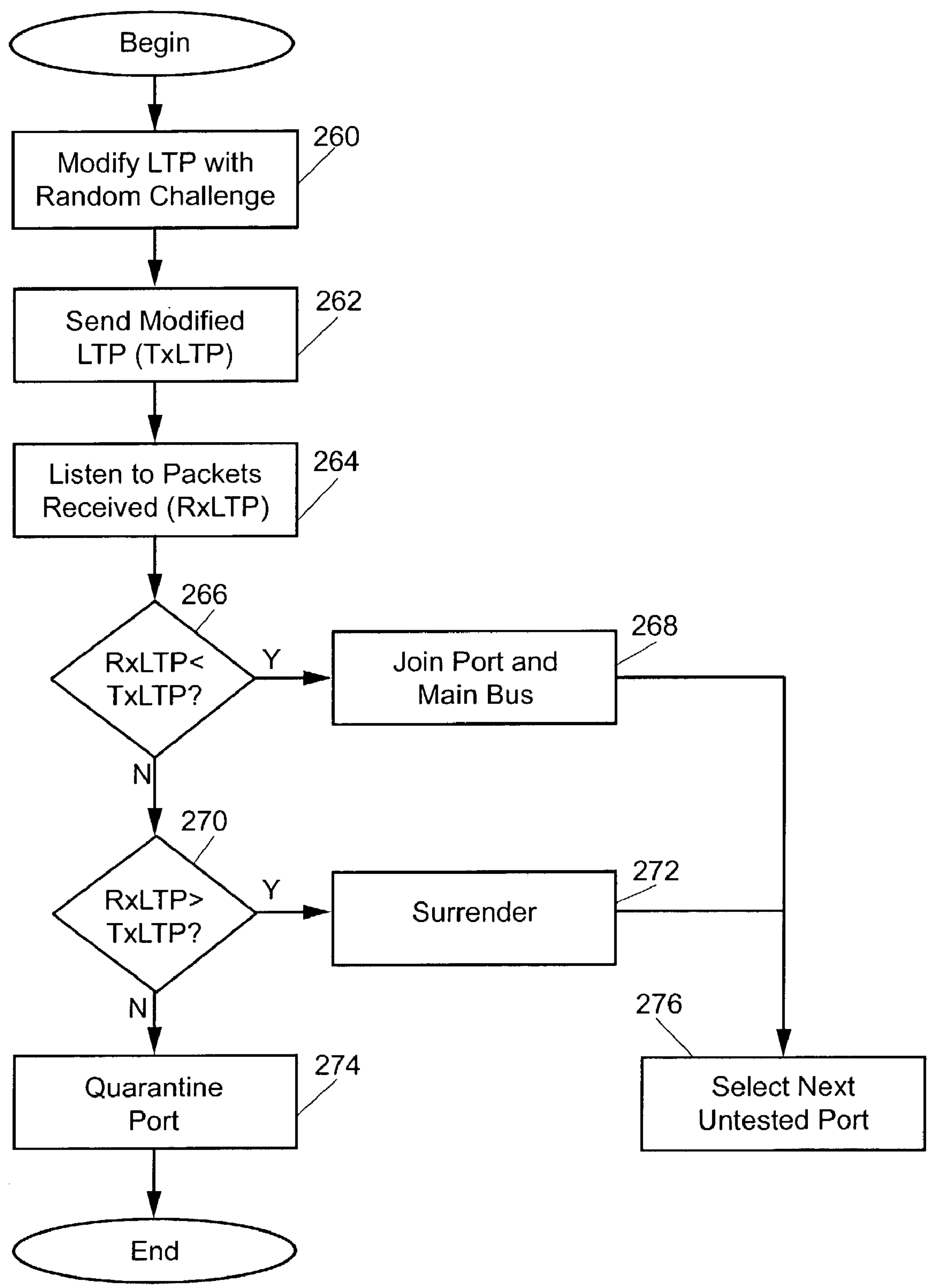
FIG. 13E is a detailed flow diagram that illustrates issuing a random challenge in accordance with one embodiment of the present invention.

Referring now to FIG. 13E, a flow diagram illustrating issuing a random challenge in accordance with one embodiment of the present invention is presented. At reference numeral 260, the loop test packet is modified to include random data. At reference numeral 262, the modified loop test packet is sent on the peer bus. At reference numeral 264, packets received by the port connected to the main bus are monitored. The packets are compared as discussed with respect to FIG. 13A, above. If the packets are equivalent, a loop exists and the port is quarantined at reference numeral 274. The next port is then selected for lop testing. This process continues until all ports have been tested for loops.

Figure 13F:
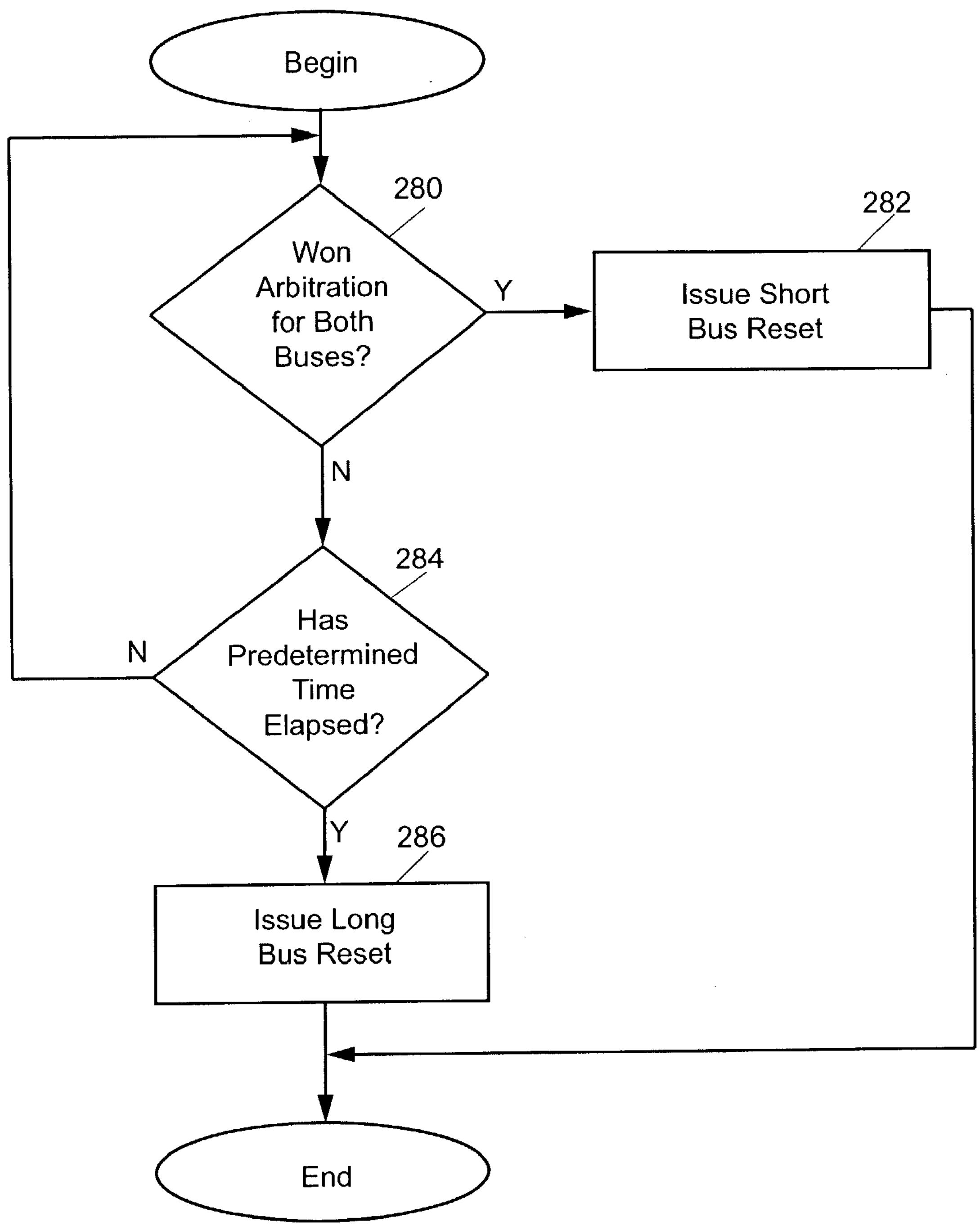
FIG. 13F is a detailed flow diagram that illustrates issuing joining a port to bus in accordance with one embodiment of the present invention.

Referring now to FIG. 13F, a flow diagram illustrating joining a port to the main bus inn accordance with one embodiment of the present invention is presented. At reference numeral 280, a check is made to determine whether arbitration for both the main bus and the peer bus has been won. If arbitration for both buses has been won, a relatively short bus reset is issued at reference numeral 282. If arbitration for both buses has not been won, a check is made at reference numeral 284 to determine whether a period of time has elapsed since beginning the Join process. If the period of time has not elapsed, execution continues at reference numeral 280. If the period of time has elapsed, a relatively long bus reset is issued at reference numeral 286.

As discussed above with reference to FIG. 13D, many other embodiments of the present invention are possible when the roles of the sending and receiving ports are reversed. Arbitration for the main bus is granted first. A first port that is active (has been tested, found free of loops and joined to a PHY), sends the loop test packet containing a first unique identifier. A second port that has not been tested and is from the same node as the first port listens for a packet containing a second unique identifier. If a first criteria is met with respect to the first and second identifiers, or if a loop test packet is not received within a period of time, the second port may be joined with the node. If a second criteria is met with respect to the first and second identifiers, the second port is quarantined.

According to a presently preferred embodiment, the present invention may be implemented in software or firmware, as well as in programmable gate array devices, Application Specific Integrated Circuits (ASICs), and other hardware.

ALTERNATIVE EMBODIMENTS

Thus, a novel method and apparatus for loop detection on a serial bus has been described. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. In a system including at least one bus, each said bus including at least one node, each said node including at least one port, a method for loop breaking, said method comprising:

transmitting a first packet on a bus attached to a first port of said node, said first packet containing a unique identifier;

listening for a second packet for a period of time on a second port of said node, said second packet containing said unique identifier;

joining said first port to said node if said second packet is not received within said period of time; and quarantining said first port if said second packet is received within said period of time.

2. A computer-readable medium containing instructions which, when executed by a computer, performs loop breaking in a system including at least one bus, each said bus including at least one node, each said node including at least one port, said instructions comprising:

transmitting a first packet on a bus attached to a first port of said node, said first packet containing a unique identifier;

listening for a second packet for a period of time on a second port of said node, said second packet containing said unique identifier;

joining said first port to said node if said second packet is not received within said period of time; and quarantining said first port if said second packet is received within said period of time.

3. A computer-readable medium containing instructions which, when executed by a computer, performs loop breaking in a system including at least one communications bus, each said bus including at least one node, each said node including at least one port, said instructions comprising:

transmitting a first packet on said first bus from a first port of said node, said first packet containing a unique identifier;

listening for a second packet for a period of time on a second port of said node, said second port operatively coupled to a second bus, said second port not operatively coupled to said node, said second packet containing said unique identifier, joining said second port to said node if said second packet is not received within said period of time; and quarantining said second port if said second packet is received within said period of time.

4. A computer-readable medium containing instructions which, when executed by a computer, performs loop breaking in a system including at least one communications bus, each said bus including at least one node, each said node including at least one port, the instructions comprising:

transmitting a first packet on said first bus from a first port of said node, said first packet including a first identifier;

listening for a second packet for a first amount of time on a second port of said node, said second packet including a second identifier;

joining said first port and said node if said second identifier meets a first criterion with respect to said first identifier;

surrendering control of said first bus if said second identifier meets a second criterion with respect to said first identifier; and quarantining said first port if said second identifier meets a third criterion with respect to said first identifier.

* * * * *